US00RE34187E

United States Patent [19]

Yamanami et al.

[11] E Patent Number: Re. 34,187

[45] Reissued Date of Patent: Mar. 2, 1993

[54] COORDINATES INPUT SYSTEM

[75] Inventors: Tsuguya Yamanami; Toshiaki Senda, both of Saitama; Azuma Murakami, Kanagawa, all of Japan

[73] Assignee: Wacom Co. Ltd., Saitama, Japan

[21] Appl. No.: 485,669

[22] Filed: Feb. 27, 1990

Related U.S. Patent Documents

Reissue of:

[64] Patent No.: 4,786,765
Issued: Nov. 22, 1988
Appl. No.: 76,962
Filed: Jul. 23, 1987

[30] Foreign Application Priority Data

Jul. 26, 1986 [JP] Japan ..... 61-171684
Aug. 20, 1986 [JP] Japan ..... 61-194492
Aug. 28, 1986 [JP] Japan ..... 61-202483

[51] Int. Cl.[5] ..... G08C 21/00
[52] U.S. Cl. ..... 178/19; 340/706
[58] Field of Search ..... 178/18, 19

[56] References Cited

U.S. PATENT DOCUMENTS 2,812,427 11/1957 Magondeaux ..... 250/6
2,899,546 8/1959 Hollman ..... 250/6
2,937,917 5/1960 Anthony ..... 346/139
2,958,781 11/1960 Marchal et al. ..... 250/83.3
3,117,277 1/1964 Magondeaux ..... 325/6
3,373,425 3/1968 Barischoff ..... 343/6.8
3,376,551 4/1968 Armbruster ..... 340/172.5
3,461,400 8/1969 Koda ..... 331/65
4,227,044 10/1980 Fencl ..... 178/19
4,240,065 12/1980 Howbrook ..... 340/146.3 SY
4,520,357 5/1985 Castleberry et al. ..... 340/783
4,532,376 6/1985 Rockwell ..... 178/18
4,542,261 9/1985 Behnke ..... 178/18
4,580,007 4/1986 Searby et al. ..... 178/18
4,678,870 7/1987 Taguchi et al. ..... 178/19
4,704,501 11/1987 Taguchi et al. ..... 178/19

FOREIGN PATENT DOCUMENTS 47-67704 6/1972 Japan .
49-11432 1/1974 Japan .
57-116883 1/1979 Japan .
56-129871 8/1981 Japan .
56-150086 10/1981 Japan .
57-57449 4/1982 Japan .
58-180303 11/1983 Japan .
59-3537 1/1984 Japan .
61-8809 1/1986 Japan .

*Primary Examiner*—Stafford D. Schreyer
*Attorney, Agent, or Firm*—Lowe, Price, LeBlanc & Becker

[57] ABSTRACT

Disclosed is a coordinates input system having a tablet constituting a coordinates input portion, a position designating device such as a stylus pen, and a position detection circuit adapted to drive said tablet and detect a position at which coordinates are input by said position designating device. The system comprises: an antenna coil disposed around a coordinates input range of said tablet; and a tuning circuit disposed in said position designating device and including a coil and a capacitor, wherein radio waves are generated by said antenna coil by application of an AC signal of a predetermined frequency thereto, and the status of said tuning circuit is discriminated by a signal of said antenna coil at the time when the transmission of said radio waves is suspended, thereby detecting the status of said position designating device. Hence, this coordinates input system is capable of detecting the status of the position designating device without connecting the position designating device and other circuits by means of a cord and without providing the position designating device with a conventionally employed complicated signal generating circuit, a battery, and the like.

92 Claims, 13 Drawing Sheets

COORDINATES INPUT SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a coordinate input system and, more particularly, to a coordinate input system which is capable of detecting the status of a position designating device which has designated only the position of coordinates to be input as well as the status of various types of operation designated by the same.

2. Statement of the Related Art

Hitherto, a system has been known for detecting the status (hereafter referred to as the "pen-down status") of a position designating device which has designated only the position of coordinates to be input on a tablet. This system is arranged such that a switching means is provided in the position designating device and is turned ON (or OFF) only in the pen-down status, and timing signals based on the ON (or OFF) status of the switching means are transmitted to a position detecting circuit via a cord or by the use of ultrasonic waves or infrared ways.

However with a system of the type in which timing signals are transmitted from the position designating device via a cord, there has been a drawback in that the cord causes a hindrance to he operating efficiency of the position designating device. In addition, with a system of the type in which timing signals are transmitted by the use of ultrasonic waves or infrared rays, a transmitter, a signal generating circuit, a battery, and the like must be provided in the position designating device per se. Hence, there has been a drawback in that the arrangement of the position designating device becomes complicated and large in size and weight, thereby aggravating the operating efficiency of the position designating device.

SUMMARY OF THE INVENTION

Accordingly, a primary object of the present invention is to provide a coordinate input system which is capable of detecting the status of a position designating device without deteriorating the operating efficiency of the position designating device.

To this end, according to the present invention, there is provided a coordinates input system having a tablet constituting a coordinates input portion, a position designating device such as a stylus pen, and a position detection circuit adapted to drive the tablet and detect a position at which coordinates are input by the position designating device, the system comprising: an antenna coil disposed around a coordinates input range of the tablet; and a tuning circuit disposed in the position designating device and including a coil and a capacitor, wherein radio waves are generated by the antenna coil by application of an AC signal of a predetermined frequency thereto, and the status of the tuning circuit is discriminated by a signal of the antenna coil at the time when the transmission of the radio waves is suspended, thereby detecting the status of the position designating device.

According to this aspect of the invention, the tuning circuit which has received radio waves from the antenna coil resonates or does not resonate with a substantially identical frequency or an identical or different phase in correspondence with its status, reflects or does not reflect radio waves whose frequency is substantially identical and whose phase is identical or different. From the fact that signals are ore are not generated by the antenna coil which has suspended the transmission of radio waves on the basis of the reflected radio waves, the status of the tuning circuit can be discriminated and the status of the position designating device can be detected. Accordingly, no cord is required for connecting the position designating device and other circuits, and it suffices only to provide the position designating device with a tuning circuit, including a coil and a capacitor. Therefore, a conventionally employed complicated signal generating circuit, a battery and the like become unnecessary, so that it is possible to provide a position designating device which excels in operating efficiency, and its status can be detected accurately.

A second object of the present invention is to provide a coordinate input system which is capable of detecting the positional status of a position designating device as well as the status of various types of operation designated by the same.

To this end, according to another aspect of the present invention, there is provided a coordinates input system having a tablet constituting a coordinates input portion, a position designating device such as a stylus pen, and a position detection circuit adapted to drive the tablet and detect a position at which coordinates are input by the position designating device, the system comprising; a plurality of tuning circuits disposed in the position designating device, each of the plurality of tuning circuits including a coil and a capacitor to constitute a set and being adapted to transmit radio waves with mutually equivalent tuning frequencies and different phases in response to an external signal; switching means disposed in the position designating device and adapted to turn ON and OFF the connection between the coil and the capacitor of each of the tuning circuits; and an antenna coil disposed around a coordinates input range of the tablet; wherein radio waves are generated by the antenna coil when an AC signal of a frequency identical with that of the tuning frequency is intermittently applied t the antenna coil, the status of the position and operation of the position designating device is detected when signals responded to by the tuning circuits during suspension of transmission of the radio waves are received by the antenna coil, and the ON-OFF status of the switching means with respect to the tuning circuits is discriminated by means of input signals having mutually different phases with respect to output signals of the antenna coil.

According to this aspect of the invention, when the switches of the tuning circuits are ON, the tuning circuits resspectively transmit signals with peculiar phase differences with respect to signal transmitted by the antenna coil, and the antenna coil receives the same. The positional and operational status of the position designating device can be detected by reception of the signals. Discrimination can be made as to which of the switches of the position designating devices has been turned ON by input signals having mutually different phases. Accordingly, no cord is required for connecting the position designating device and other circuits, and it suffices only to provide the position designating device with a plurality of tuning circuits each including a coil and a capacitor. Therefore, a conventionally employed complicated signal generating circuit, a battery and the like become unnecessary, and the operational status of the plurality of switches provided in the position designating device can be discriminated without using a cord, thereby permitting color designation and erasure designation for the input pen by means of the switches. Thus, it is possible to provide a position designating device which excels in operating efficiency.

A third object of the present invention is to provide a coordinate input system which is capable of detecting the positional status of a position designating device, the status of its use, and the like without causing any hindrance to the operating efficiency thereof.

To this end, according to still another aspect of the present invention, there is provided a coordinates input system having a tablet constituting a coordinates input portion, a position designating device such as a stylus pen, and a position detection circuit adapted to drive the tablet and detect a position at which coordinates are input by the position designating device, the system comprising: a tuning circuit disposed in the position designating device, the tuning circuit including a set of a coil, a capacitor, and/or a resistor and being adapted to generate radio waves with mutually equivalent tuning frequencies and a change in the phase in response to an external signal by changing any of the values of the coil, the capacitor, and/or the resistor in correspondence with the status of use of the position designating device; and an antenna coil disposed around a coordinates input range of the tablet; wherein radio waves are generated by the antenna coil when an AC signal of a frequency identical with that of the tuning frequency is intermittently applied to the antenna coil, the status of the position and operation of the position designating device is detected when signals responded to by the tuning circuit during suspension of transmission of the radio waves are received by the antenna coil, and the status of use of the position designating device is discriminated by means of the input signals having mutually different phases with respect to output signals of the antenna coil.

According to this aspect of the invention, any of the values of the coil, the capacitor, and the resistor of the tuning circuit changes in accordance with the status of use of the position designating device, which in turn causes the phase of the tuning circuit to undergo change with respect to an input signal of the antenna coil, and the tuning circuit thereby responds to the same and transmits a signal. The antenna coil receives that signal. The positional and operational status of the position designating device can be detected by reception of the signal. The status of use of the position designating device can be discriminated in accordance with a change in the phase of the input signal. Accordingly, no cord is required for connecting the position designating device and other circuits, and it suffices only to provide the position designating device with a tuning circuit, including a coil and a capacitor. Therefore, a conventionally employed complicated signal generating circuit, a battery and the like become unnecessary. In addition, signals corresponding to the status of use of the position designating device can be received without using a cord, and the operational status of the switch provided in the position designating device can be discriminated without using a cord. Hence, it becomes possible to designate, for instance, the size of a line drawn in correspondence with a pressing force of an input pen. Thus, it is possible to provide a position designating device which excels in operating efficiency.

The above and other objects, features, and advantages of the present invention will become apparent from the following detailed description of the invention when read in conjunction with the accompanying drawings.

BRIEF DESCRIPTION OF THE DRAWINGS

*FIGS. 4A–4G are respectively exemplary of waveforms at points (A)–(G), FIG. 3;*

*FIGS. 8A–8Gb are respectively waveforms at points (A)–(Gb), FIG. 7;*

*FIGS. 9A, 9B, 9C and 9D are waveforms indicating the operation of a phase detector in FIG. 7 in response to waves applied thereto differing in phase by 0°, 90°, 180° and 270°, respectively;*

*FIGS. 11A, 11B, 11C and 11D are waveforms indicating the operation of phase detectors in FIG. 10, in response to waves applied thereto differing in phase by 0°, 90°, 180° and 270°, respectively;*

*FIGS. 14A–14F are exemplary waveforms at points (A)–(F), FIG. 13;*

*FIGS. 15A, 15B, 15C and 15D are waveforms indicating the operation of a phase detector in FIG. 13, in response to waves applied thereto differing in phase by 0°, 90°, 180° and 270°, respectively;*

*FIGS. 16A, 16B, 16C and 16D are waveforms indicating the operation of another phase detector in FIG. 13, in response to waves applied thereto and to a phase shifter differing in phase by 0°, 90°, 180° and 270°, respectively; and*

DESCRIPTION OF THE PREFERRED EMBODIMENTS

Figure 1:
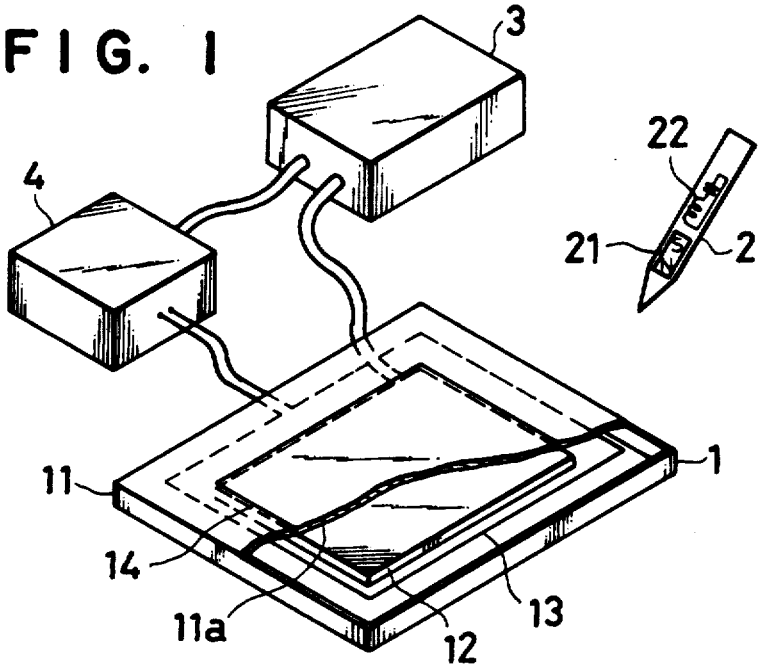
FIG. 1 is a perspective view illustrating an outline of a first embodiment of the present invention.

FIG. 1 illustrates a first embodiment of the present invention. In the drawings, reference numeral 1 denotes a tablet; 2, a position designating device (hereafter referred to as the "input pen"); 3, a position detection circuit and 4, a timing control circuit.

The tablet 1 is arranged such that a tablet body 12 and an antenna coil 13 are accommodated in a casing 11 which is made of a non-metallic material such as a synthetic resin. The tablet body 12 is connected to the position detection circuit 3, while the antenna coil 13 is connected to the timing control circuit 4.

The tablet body 12 is driven by the position detection circuit 3 and constitutes a detection section for detecting a position designated by the input pen 2. The tablet body 12 is disposed substantially in the center of the casing 11. Incidentally, a frame 14 drawn on an upper panel 11a of the casing indicates a range of the input of coordinates thereof.

As for the tablet body 12 and the position detection circuit 3, it is possible to use, for instance, those described in Japanese patent Application No. 32244/1984 "Position Detection Device" (see Japanese Patent Laid-Open No. 176133/1985) and Japanese Patent Application No. 238532/1983 "Coordinate Position Detection Device" (see Japanese Patent Laid-Open No. 129616/1985), both filed by the present applicant. The former device is arranged such that a multiplicity of magnetostrictive transmitting media are disposed parallel with the surface of the tablet body 12 such that some of the magnetostrictive transmitting media are disposed at right angles with others, and magnetostrictive vibrations are imparted periodically from one end to the other. When the input pen 2 approaches the same, the magnetostrictive vibration at that location is enhanced by means of a bar magnet provided thereto. By making use of this phenomenon, the position detection circuit 3 detects X-Y coordinates thereof through the time duration of propagation to that location. One the other hand, the latter device is arranged such that magnetostrictive media, some of which are disposed at right angles with others, are excited by an AC current, and inducted voltages thereof are fetched by detection coils, X-Y coordinates are detected by making use of the phenomenon in which, when a similar input pen approaches the same, the permeability of the magnetostrictive media changes locally with a resultant change in induced voltages.

The antenna coil 13 is arranged such that a conductive wire provided with an insulation coating such as polyvinyl chloride is disposed around the periphery of the coordinates inputting range of the tablet body 12, i.e., in the casing of this embodiment, on the rear surface of the upper panel 11a of the casing 11 around the frame 14. Incidentally, although the conductive wire is given one turn in the illustrated example, a plurality of turns may be provided, as required.

The input pen 2 incorporates a tuning circuit 22 which includes a magnetism generator for designating a position, e.g., a bar magnet 21, a coil, and a capacitor.

Figure 2:
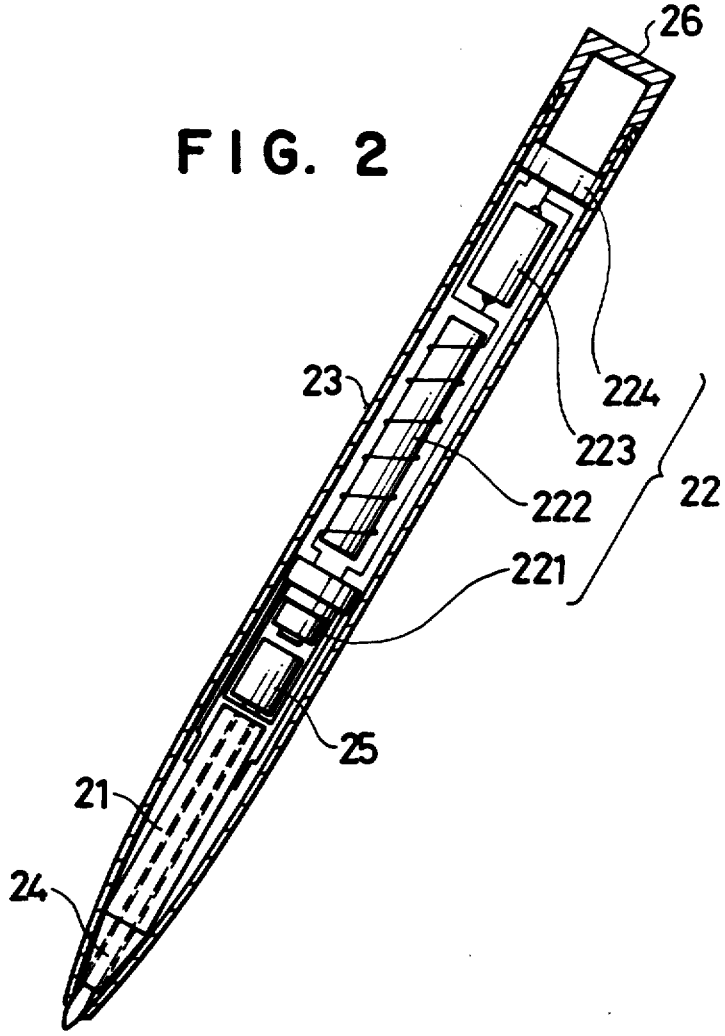
FIG. 2 is a cross-sectional view of an input pen.

FIG. 2 illustrates a detailed structure of the input pen 2 which is arranged as follows: A core member 24, such as a ball-point pen, the bar magnet 21 having a through-hole capable of slidably accommodating the core member 24, a coil spring 25, and a tuning circuit 22 constituted by a switch 221, a coil 222 with a core, a capacitor 223, and a variable capacitor 224 are incorporated, in that order starting from a tip of the input pen 2, as an integral combination inside a pen shaft 23 which is constituted by a non-magnetic material, such as a synthetic resin, or, for instance, aluminum. A cap 26 is installed at a rear end thereof.

Figure 3:
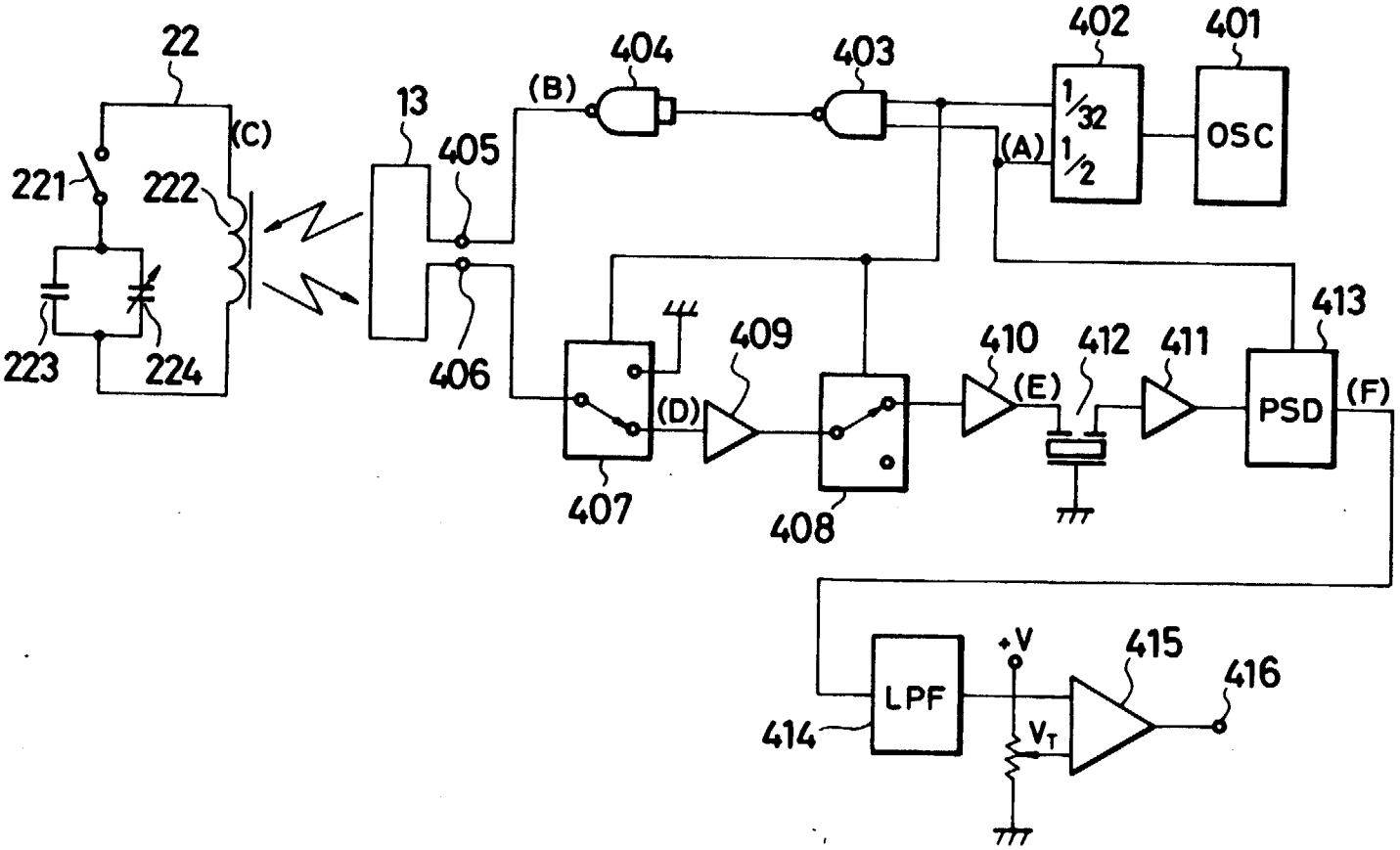
FIG. 3 is a block diagram of a timing control circuit.

The switch 221 is arranged such that, when the core member 24 is pressed into the inside of the pen shaft 23 by, for instance, pressing a tip thereof against the surface of the tablet, the switch 221 is turned ON by being pressed from a rear end thereof via the coil spring 25. In addition, as is also shown in FIG. 3, the capacitor 223 and the variable capacitor 224 are connected to each other in parallel. One end of the coil 222 is connected to ends of the capacitor 223 and the variable capacitor 224 via the switch 221, while the other end of the coil 222 is connected to the other ends thereof, thereby constituting a known parallel resonance circuit.

It should be noted that values of the coil 222, the capacitor 223, and the variable capacitor 224 are selected in such a manner as to resonate (to be tuned) with the frequency of radio waves transmitted from the antenna coil 13.

FIG. 3 shows a detailed arrangement of the timing control circuit 4. In the drawing, reference numeral 401 denotes an oscillator; 402, a frequency demultiplication counter; 403, 404 denote NAND gates; 405 denotes a transmission terminal; 406, a reception terminal; 407, 408, denote reception changeover switches; 409, 410, 411, amplifiers; 412 denotes a filter; 413, a phase detector; 414, a low-pass filter; 415, a comparator; and 416, an output terminal.

Figure 4:
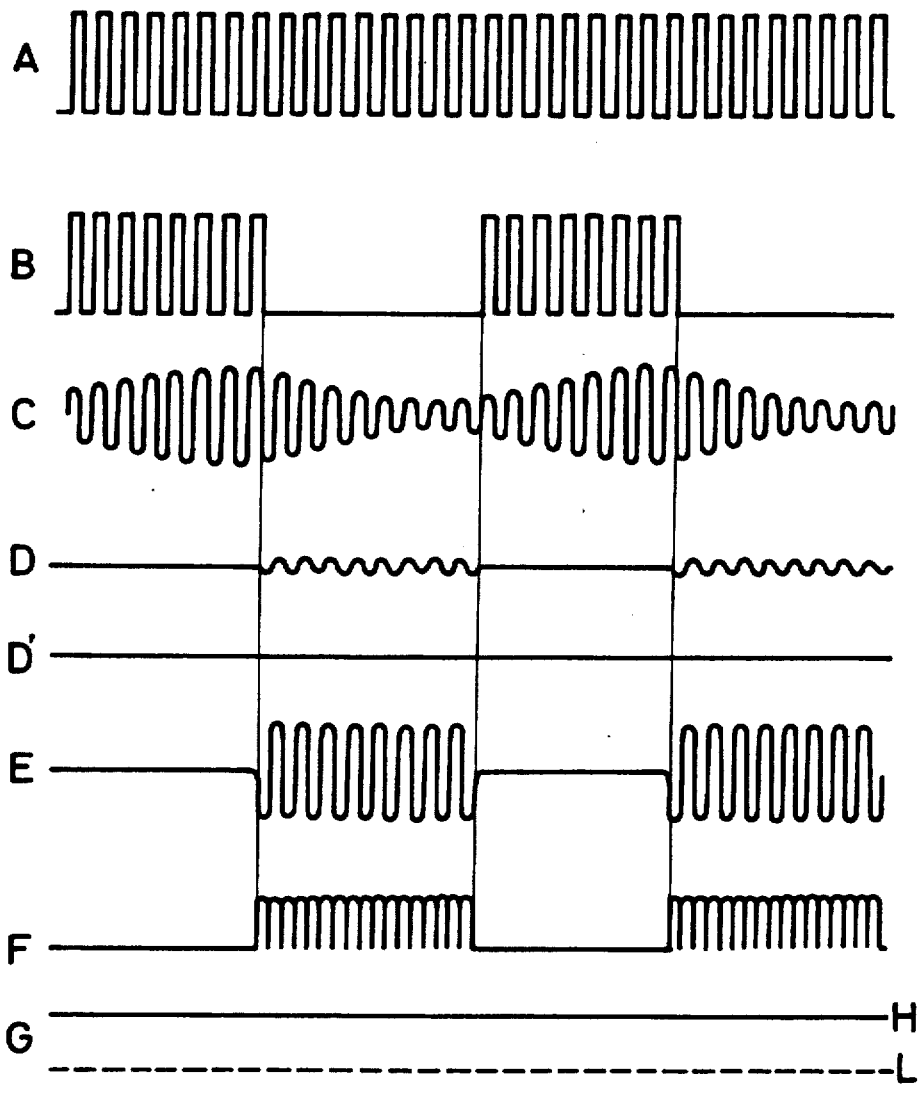
[FIG. 4 is a diagram illustrating waveforms of various sections shown in FIG. 3;]

FIG. 4 is a waveform diagram of signals in each section shown in FIG. 3. Hereafter, a detailed description will be made of operation.

A clock pulse of, say 910 kHz generated by the oscillator 401 is divided into ½ and 1/32 by the frequency demultiplication counter 402. A pulse signal A of 455 kHz obtained by dividing the frequency into ½ is input to one input terminal of the NAND gate 403, while a pulse signal of 28.44 kHz obtained by dividing the frequency into 1/32 is input to the other input terminal. Its output is further sent to the NAND gate 404, and becomes a signal B in which a 455 kHz pulse signal is sent or is not sent for each 28.44 kHz, as shown in FIG. 4.

The signal B is sent to the antenna coil 13 via the transmission terminal 405 and is transmitted as radio waves. At that juncture, if the switch 221 is ON in the tuning circuit 22 of the input pen 2, the tuning circuit 22 resonates with radio waves that are transmitted. Since the tuning circuit 22 continues to resonate while being attenuated while the transmission on the transmission side is stopped, the tuning circuit 22 generates a signal C as shown in FIG. 4, and the signal C is transmitted as radio waves by the coil 222 and is received by the antenna coil 13.

Since the reception changeover switches 407, 408 have already been changed over by the aforementioned 28.44 kHz pulse signal, the reception changeover switches 407, 408 receive signals from the reception terminal 406 only during the period when transmission is suspended. The input signal becomes a signal D as shown in FIG. 4 if the switch 221 of the tuning circuit 22 is ON, while the input signal becomes a signal D' if it is OFF. The input signal D is amplified into a signal D by the amplifiers 409, 410, a component of noise is eliminated through a mechanical filter 412 having a resonance frequency of 455 kH, and the signal is then is transmitted to the phase detector 413 via the amplifier 411.

The 455 kHz pulse signal A has already been input to the phase detector 413. At this juncture, if the phase of the input signal E coincides with the phase of the pulse signal A, a signal F, in which a lower half of the signal E is inverted, as shown in FIG. 4, is output.

The signal F is converted into a flat signal by means of a low-pass filter 414 having a sufficiently low cut-off frequency, and is input to one input terminal of the comparator 415. A predetermined threshold voltage VT has been input to the other input terminal of the comparator 415, the output of the low-pass filter 414 is compared with the threshold voltage VT, and a high (H) level signal G is output to the output terminal 416.

Incidentally, in the case of the signal D', the signal level is "0", including those of both signals E and F, and the level of the signal G becomes low (L).

If the signal G is transmitted to the position detection circuit 3 on the basis of a definition that when the signal G is at high level, the status is that of pen down, and that when it is at low level, the status is not that of pen down, the input of a position can be effected simply by pressing the tip of the input pen 2 against the tablet at a position where coordinates are to be input, by operating the input pen 2 on the tablet 1.

Incidentally, although, in the foregoing embodiment, a changeover is effected by the turning ON and OFF of the switch in the tuning circuit 22 to determine whether or not it is a pen-down status, it is possible to provide an alternative arrangement in which the capacity of the capacitor in the tuning circuit is varied on the basis of the operation of the input pen 2, and the phase of the reflected signal is changed to alter the waveform of the signal F, thereby making it possible to vary an output level of the low-pass filter. Thus, the switch per se is not essential.

Figure 5:
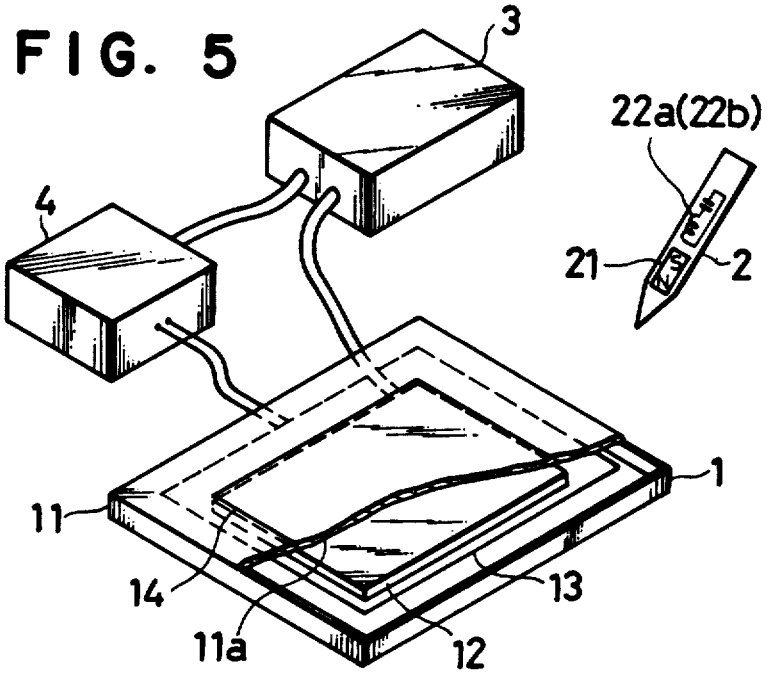
FIG. 5 is a perspective view of a position designating device illustrating a second embodiment.

FIG. 5 shows a second embodiment of the present invention. In the drawing, reference numeral 1 denotes the tablet; 2, the position designating device (hereafter referred to as the "input pen"); and 3, the timing control circuit. The details of these components are the same as those of the above-described first embodiment except for the portions that are described below.

The input pen 2 incorporates the magnetism generator for designating a position, such as the bar magnet 21, and two sets of tuning circuits 22a, 22b, each set including the coil and the capacitor.

Figure 6:
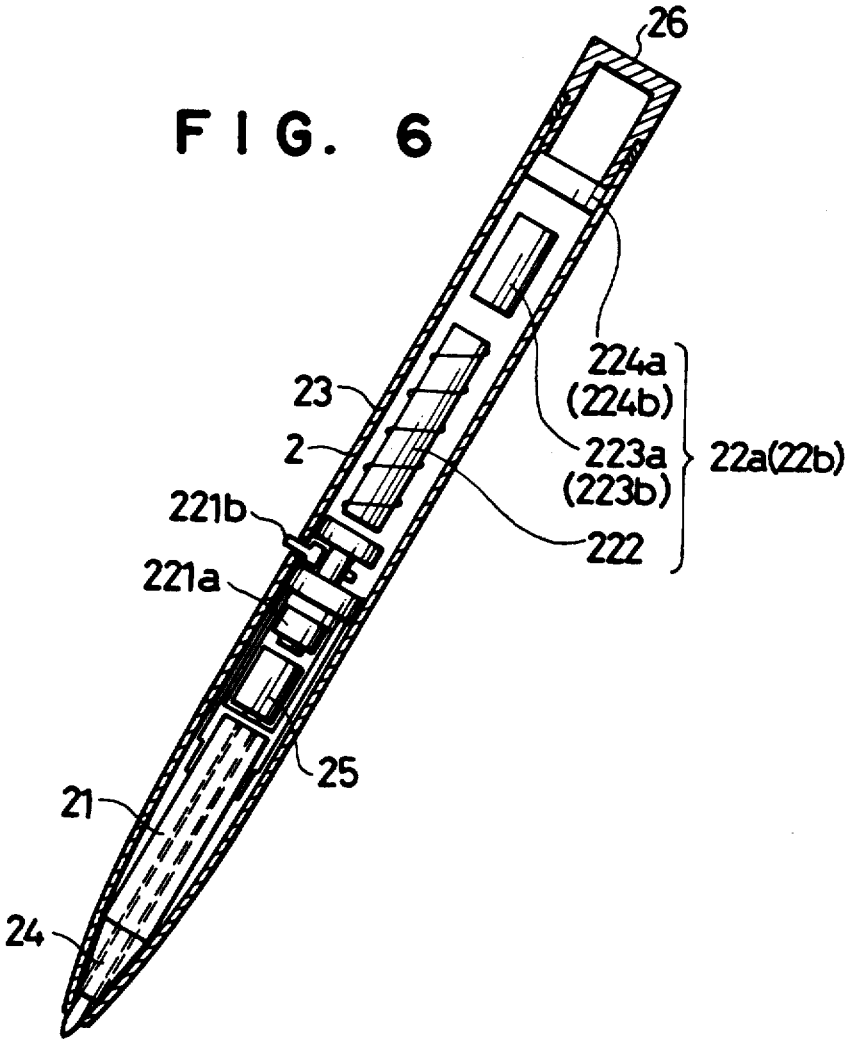
FIG. 6 is a cross-sectional view of the input pen.
Figure 7:
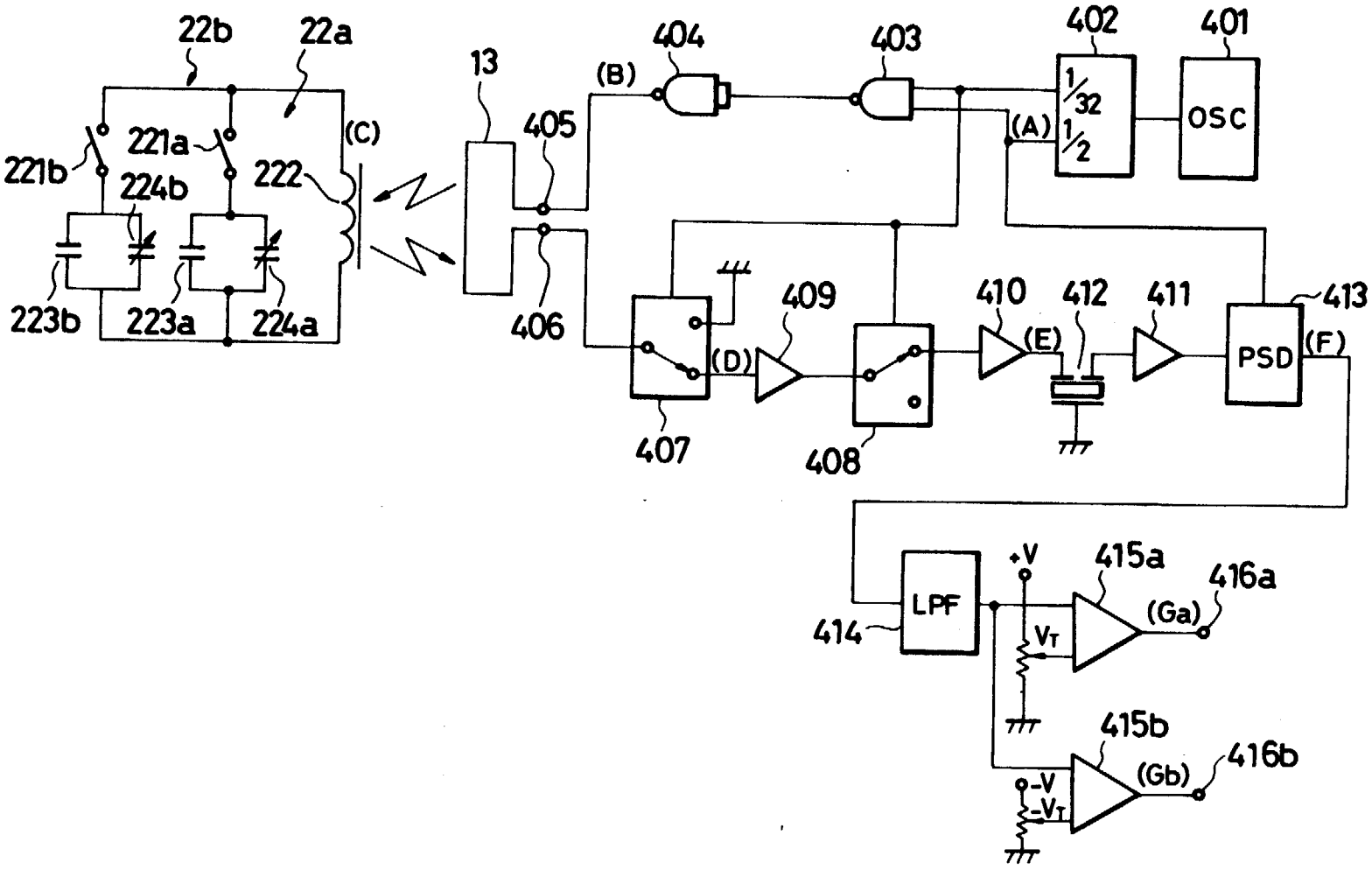
FIG. 7 is a block diagram of the timing control circuit in a case where two switches are provided.

FIG. 6 shows a detailed structure of the input pen 2 which is arranged as follows: The core member 24, such as a ball-point pen, the bar magnet 21 having a through-hole capable of slidably accommodating the core member 24, the coil spring 25, and two sets of tuning circuits 22a, 22b, constituted by switches 221a, 221b, the coil 222 with an iron core, two capacitors 223a, 223b, and two variable capacitors 224a, 224b for fine adjustment, as shown in FIG. 7, are incorporated, in that order starting from a tip of the input pen 2, as an integral combination inside the pen shaft 23 which is constituted by a non-magnetic material, such as a synthetic resin. The cap 26 is installed at a rear end thereof.

The switch 221a is arranged such that, when the core member 24 is pressed into the inside of the pen shaft 23 by, for instance, pressing a tip thereof against the surface of the tablet, the switch 221 is turned ON by being pressed from a rear end thereof via the coil spring 25. The switch 221b sends a signal to a separate host computer (not shown) each time the switch 211b is turned ON by a pressing operation when the switch 221a is ON, and is adapted to designate, for instance the changeover of color or coloring of a certain portion in correspondence with the number of ON operations thereof. In addition, as is also shown in FIG. 7, the capacitor 223a and the variable capacitor 224a are connected to each other in parallel. One end of the coil 222 is connected to ends thereof via the switch 221a, while the other end of the coil 222 is connected to the other ends thereof, thereby constituting one parallel resonance circuit 22a. The capacitor 223b, the variable capacitor 224b, the coil 222, and the switch 221b are similarly connected to each other. In this case, the arrangement is such that when both switches 221a, 221b are turned ON, the other parallel resonance circuit 22b is formed.

It should be noted that the resonance circuits 22a, 22b are set in such a manner that the resonance circuit 22a has the same phase as that of radio waves transmitted from the antenna coil 13 and resonates (is tuned) with the frequency thereof, while the resonance circuit 22b resonates with a phase difference of 180° therebetween. Since the resonance circuits 22a, 22b are set as described above, selectivity $Q=R/(\omega_0 L)$ (where $\omega_0$ is an angular velocity of resonance; R is a value of resistance; and L is an inductance) changes, so that a phase shift occurs. At the same time, although a resonance frequency also changes, resonance is made possible.

FIG. 7 shows a detailed arrangement of the timing control circuit 4. In the drawing, reference numeral 401 denotes the oscillator (OSC); 402, the frequency demultiplication counter; 403, 404 denote NAND gates; 405 denotes the transmission terminal; 406, the reception terminal; 404, 408, denote reception changeover switches; 409, 410, 411, amplifiers; 412 denotes the filter; 413, the phase detector (PSD); 414, the low-pass filter (LPF); 415a, 415b denote comparitors; and 416a, 416b, output terminals.

Figure 8:
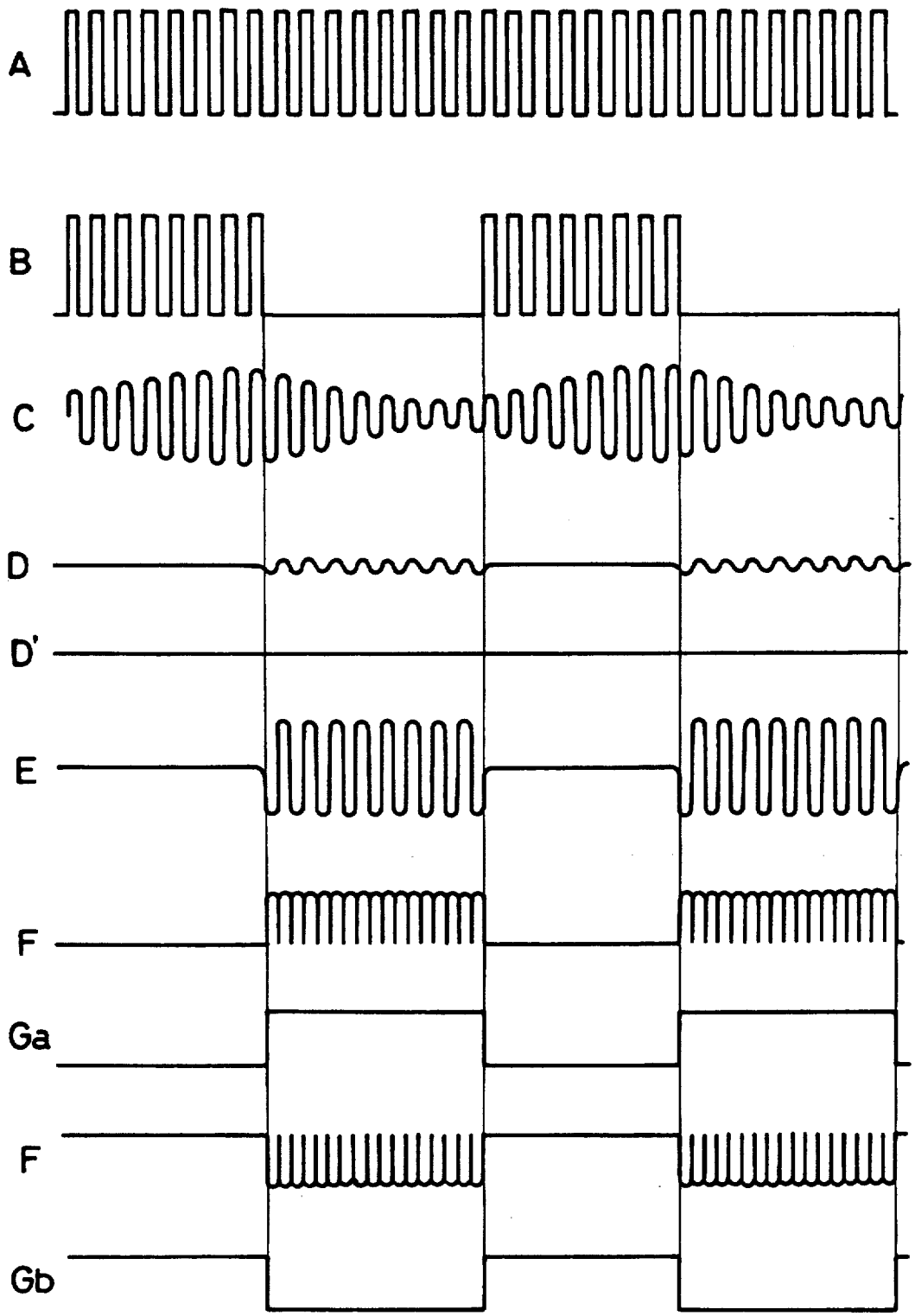
[FIG. 8 is a diagram illustrating waveforms of various sections shown in FIG. 7;]

FIG. 8 is a waveform diagram of signals of various sections shown in FIG. 7, Hereafter, a detailed description will be made of operation.

A clock pulse of, say 910 kHz generated by the oscillator 401 is divided into ½ and 1/32 by the frequency demultiplication counter 402. The pulse signal A of 455 kHz obtained by dividing the frequency into ½ is input to one input terminal of the NAND gate 403, while a pulse signal of 28.44 kHz (with a pulse width of 17.6 μs) obtained by dividing the frequency into 1/32 is input to the other input terminal. Its output is further sent to the NAND gate 404, and becomes the signal B in which a 455 kHz pulse signal is sent or is not sent for each 17.6 μs, as shown in FIG. 8.

The signal B is sent to the antenna coil 13 via the transmission terminal 405 and is transmitted as radio waves. At that juncture, for example, if the switch 221a is ON in the tuning circuit 22a of the input pen 2, the tuning circuit 22a resonates with the transmitted radio waves. Since the tuning circuit 22a continues to resonant while being attenuated while the transmission on the transmission side is stopped, the tuning circuit 22a generates the signal C as shown in FIG. 8, and the signal C is transmitted as radio waves by the coil 222 and is received by the antenna coil 13.

The reception changeover switches 407, 408, which have been changed over for each 17.6 μs by the aforementioned 28.44 kHz pulse signal, receive signals from the reception terminal 406 only during the period of suspension of transmission. The input signal becomes the signal D as shown in FIG. 8 if the switch 221a of the tuning circuit 22a is ON, while the input signal becomes the signal D' if it is OFF. The input signal D is amplified int the signal D by the amplifiers 409, 410, a component of noise is eliminated through the mechanical filter 412 having a resonance frequency of 455 kHz, and the signal is then is transmitted to the phase detector 413 via the amplifier 411. Incidentally, the amplifier 410 has an automatic level control function to set the signal E to a fixed amplitude.

The 455 kHz pulse signal A has already been input to the phase detector 413. At this juncture, since the phase of the input signal E is made to coincide with the phase of the pulse signal A, the signal F, in which a lower half of the signal E is inverted, as shown in FIG. 8, is output.

The signal F is converted into a flat signal by means of the low-pass filter 414 having a sufficiently low cut-off frequency, and is input to input terminals of the the comparators 415a, 415b. A predetermined threshold voltage +VT has been input to the other input terminals of the comparator 415a, the output of the low-pass filter 414 is compared with the threshold voltage +VT, and the high (H) level signal Ga is output to the output terminal 416a.

Incidentally, in the case of the signal D', the signal level is "0", including those of both signals E and F, and the level (not shown) of the signal Ga becomes low (L).

If the signal Ga is transmitted to the position detection circuit 3 on the basis of a definition that when the signal Ga is at high level, the status is that of pen down, and that when it is at low level, the status is not that of pen down, the input of a position can be effected simply by pressing the tip of the input pen 2 against the tablet at a position where coordinates are to be input, by operating the input pen 2 on the tablet 1.

In giving a description of a case where the switch 221b is operated, description will be made of the operating waveform of the phase detector 413 including a case where the above-described switch 221a alone is operated.

If it is assumed that a signal obtained by the frequency demultiplication by ½ of the frequency demultiplication counter 402 is $e_R$ as the input of the phase detector 413, and, referring to FIG. 9(A), since this is a square wave having an amplitude of 1, if an angular velocity thereof is assumed to be $\omega_R$, we have from the Fourier expansion the following formula:

$$e_R=(4/\pi)\{\sin \omega_R t+(\tfrac{1}{3})\sin 3\omega_R t+(1/5)\sin 5\omega_R t+\ldots\} \quad (1)$$

Furthermore, if it is assumed that a signal from the amplifier 411 is $e_i$, and that this signal is constituted by a synchronous component $e_S$ determined by a maximum value $E_S$ and an angular velocity $\omega_S$ as well as a nonsynchronous component $e_N$ which is noise and determined by a maximum value $E_N$ and an angular velocity $\omega_N$, since the angular velocity $\omega_S=\omega_R$, we have $$e_i=e_S+e_N=E_S \sin \omega_R t+E_N \sin \omega_N t \quad (2)$$

At tis juncture, if the switch 221a alone is ON, the phase of the signal $e_R$ and that of $e_S$ are identical, and if an output of the phase detector 413 is assumed to be $e_0$, we have $$e_0 = e_R \times e_i = (4/\pi)\{E_S \sin \omega_R t\}\{\sin \omega_R t + (1/3)\sin 3\,\omega_R t + \ldots\} + \quad (3)$$

-continued $$(4/\pi)\{E_N \sin \omega_N t\}\sin \omega_R t + (1/3)\sin 3\,\omega_R t + \ldots\}$$
$$= (4/\pi)\,E_S\,\{\sin^2 \omega_R t + (1/3)\sin \omega_R t \cdot \sin 3\,\omega_R t + \ldots\} + (4/\pi)\,E_N\,\{\sin \omega_N t \cdot \sin \omega_R t + (1/3)\sin \omega_N t \cdot \sin 3\,\omega_R t + \ldots\}$$

Here, since a DC component is included only in the first term $\sin^2 \omega_R t$, and the remainder is an AC component, if we focus our attention only on the DC component as the output of the low-pass filter 414 to which the output of the phase detection is imparted, and if that output is assumed to be $\overline{e_0}$, from $\sin^2 \omega_R t=(\tfrac{1}{2})\{1-\cos 2107\ {}_R t\}$, we have $$\overline{e_0}=(2/\pi)E_s \quad (4)$$

Formula (4) shows a mean value of the signal $e_0$ in FIG. 9(A).

Next, when the switches 221a, 221b are turned ON, if it is assumed that a phase difference between the signal $e_R$ and the signal $e_S$ is $\phi$, then $\phi=180°$, and if the first term of Formula (3) is assumed to be $e'_0$, we have $$e'_0=(4/\pi)E_S\{\sin (\omega_R t-\phi) \sin \omega_R t\}=(4/\pi)E_S(\tfrac{1}{2})\{\cos \phi-\cos (2\omega_R t+\phi)\} \quad (5)$$

Since the second term is an AC component, the DC output $\overline{e_0}$ becomes as follows:

$$e_0=(2/\pi)E_S \cos \phi \quad (6)$$

Since $\phi=180°$, we have $$\overline{e_0}==(2/\pi)E_S$$

Figure 9:
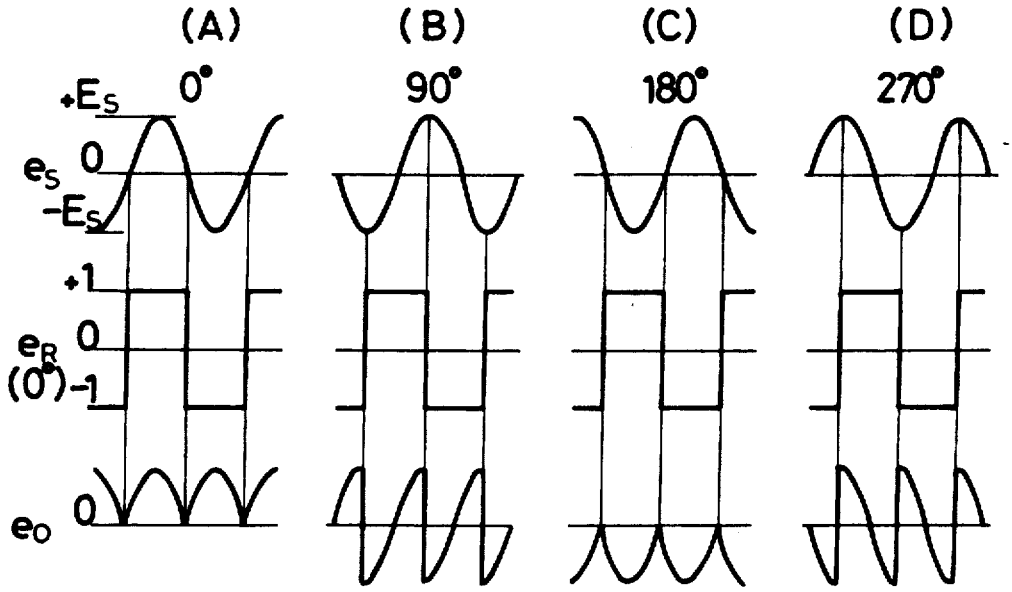
[FIG. 9 is a diagram illustrating the operation of a phase detector shown in FIG. 7;]

Formula (6) shows a mean value of the signal $e_0$ in FIG. 9 (C), the signal $e_0$ is input to the comparators 415a, 415b. The comparator 415b compares the signal with a predetermined threshold voltage −VT, and a signal Gb of low (L) level is output to the output terminal 416b.

It should be noted that when the switch 221b is OFF, the signal $e_0$ is constantly greater than the threshold voltage −VT, and its output signal Gb is constantly set to high (H) level (not shown).

Figure 10:
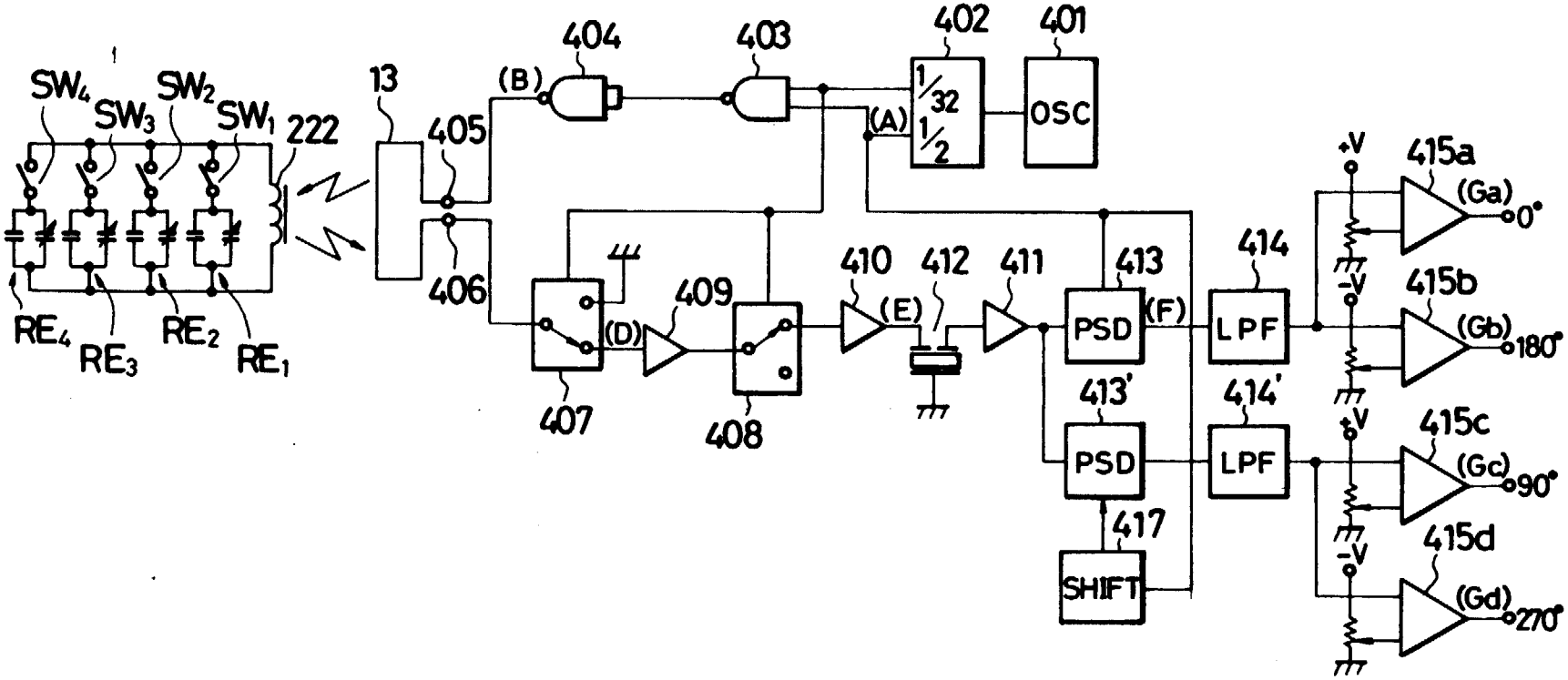
FIG. 10 is a block diagram of the timing control circuit in a case where four switches are provided.

FIG. 10 illustrates an input pen which is used in place of the input pen 2 shown in FIG. 6, and is provided with four sets of tuning circuits $RE_1$–$RE_4$ and four switches $SW_1$–$SW_4$ for selectively turning them ON by an operation. In this input pen, a shifter (SHIFT) 417 for advancing by 90° the signal $e_R$, which is obtained by dividing the frequency by ½ by the frequency demultiplication counter 402, is added to the arrangement shown in FIG. 7. Furthermore, also added to the same are a phase detector 413' for receiving signals from the shifter 417 and those from the amplifier 411 as well as a low-pass filter 414' for fetching a DC component from its output, so as to fetch operation signals for the switches $SW_1$ to $SW_4$ from four comparators 415a–415d.

Incidentally, the above-described tuning circuits $RE_1$–$RE_4$ are made to cope with, for instance, designation of various colors, the aforementioned coloring designation, and erasure designation by making the portion of the cap 26 of the input pen 2 a rotary type.

Figure 11:
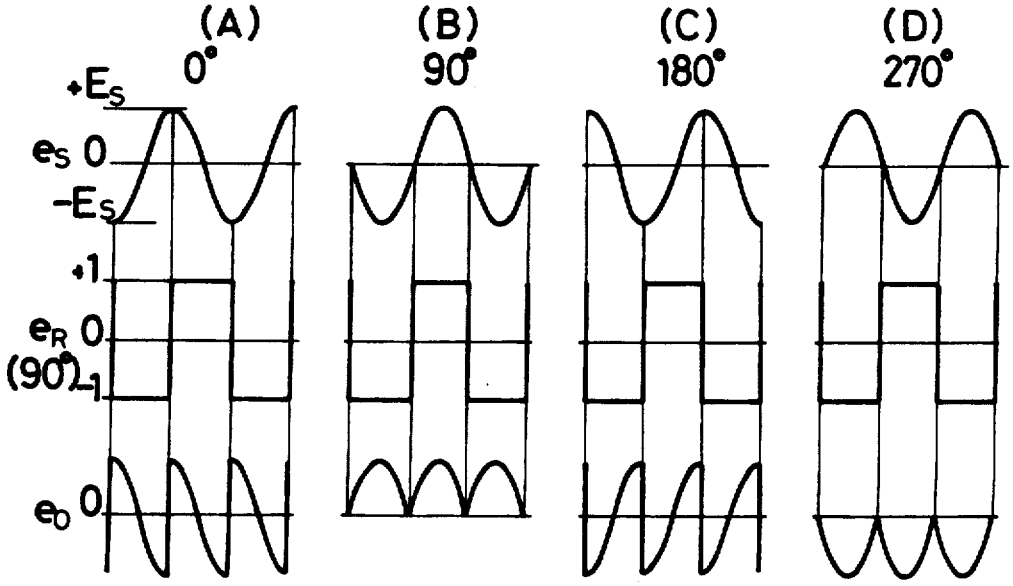
[FIG. 11 is a waveform-diagram illustrating the operation of the phase detector shown in FIG. 10;]

Description will be given hereafter of the operation of the circuit shown in FIG. 11, centering on portions that differ from those of FIG. 7.

Referring again to FIG. 9, the signals $e_S$ obtained by the tuning circuits $RE_1$–$RE_4$ respectively have phase differences of 0°, 90°, 180°, and 270° with respect to the to the signal $e_0$, as shown in (A), (B), (C), and (D). With respect to the phase differences of 90° and 270°, for instance, $e_0$ equals zero if is assumed that $\phi=90°$ and $\phi=270°$ in Formula (6). Accordingly, in order to detect the signal $e_0$ when $\phi=90°$ and $\phi=270°$, the signal $e_R$ is advanced 90°, as shown in FIG. 11. Consequently, cos $\phi$ is replaced by sin $\phi$, and the output of the low-pass filter 414' in this case becomes the mean average $e_0=(2/\pi)E_S$ of the signal $e_0$ of FIG. 11 (B) when $\phi=90°$. When $\phi=270°$, said output becomes the mean value $e_0=-(2/\pi)E_S$ of the signal shown in FIG. 11(D). Similarly, output signals Gc, Gd are obtained by the comparators 415c, 415d.

FIGS. 12 to 17 show a third embodiment of the present invention. The tablet 1, the position designating device 2, the position detection circuit 3, and the timing control circuit 4 are the same as those of the first embodiment except for the portions which will be described below.

The input pen 2 incorporates the tuning circuit 22 which includes the magnetism generator for designating a position, e.g., the bar magnet 21, the coil, the capacitor, and a resistor.

Figure 12:
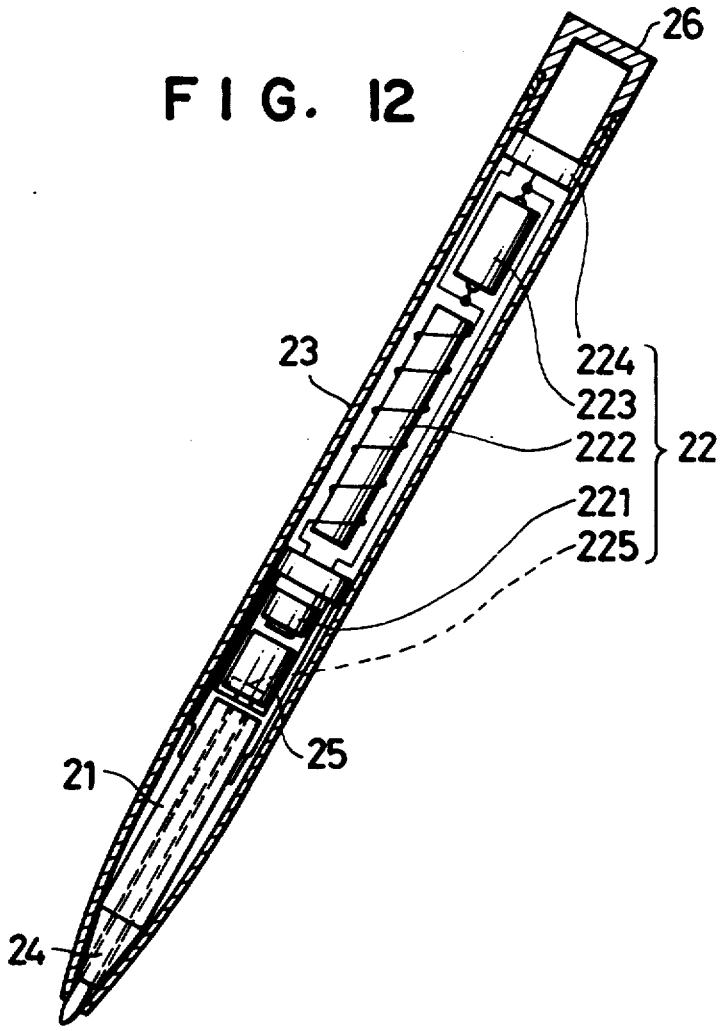
FIG. 12 is a cross-sectional view of the input pen illustrating a third embodiment of the present invention.

FIG. 12 illustrates a detailed structure of the input pen 2 which is arranged as follow: The core member 24, such as a ball-point pen, the bar magnet 21 having a through-hole capable of slidably accommodating the core member 24, the coil spring 25, and the tuning circuit 22 constituted by the switch 221, the coil 222 with a core, the capacitor 223, and the variable capacitor 224 for fine adjustment, and a pressure variable capacitor 225 are incorporated, in that order starting from the tip of the input pen 2, as an integral combination inside the pen shaft 23 constituted by a non-magnetic material, such as a synthetic resin. The cap 26 is installed at a rear end thereof.

Figure 13:
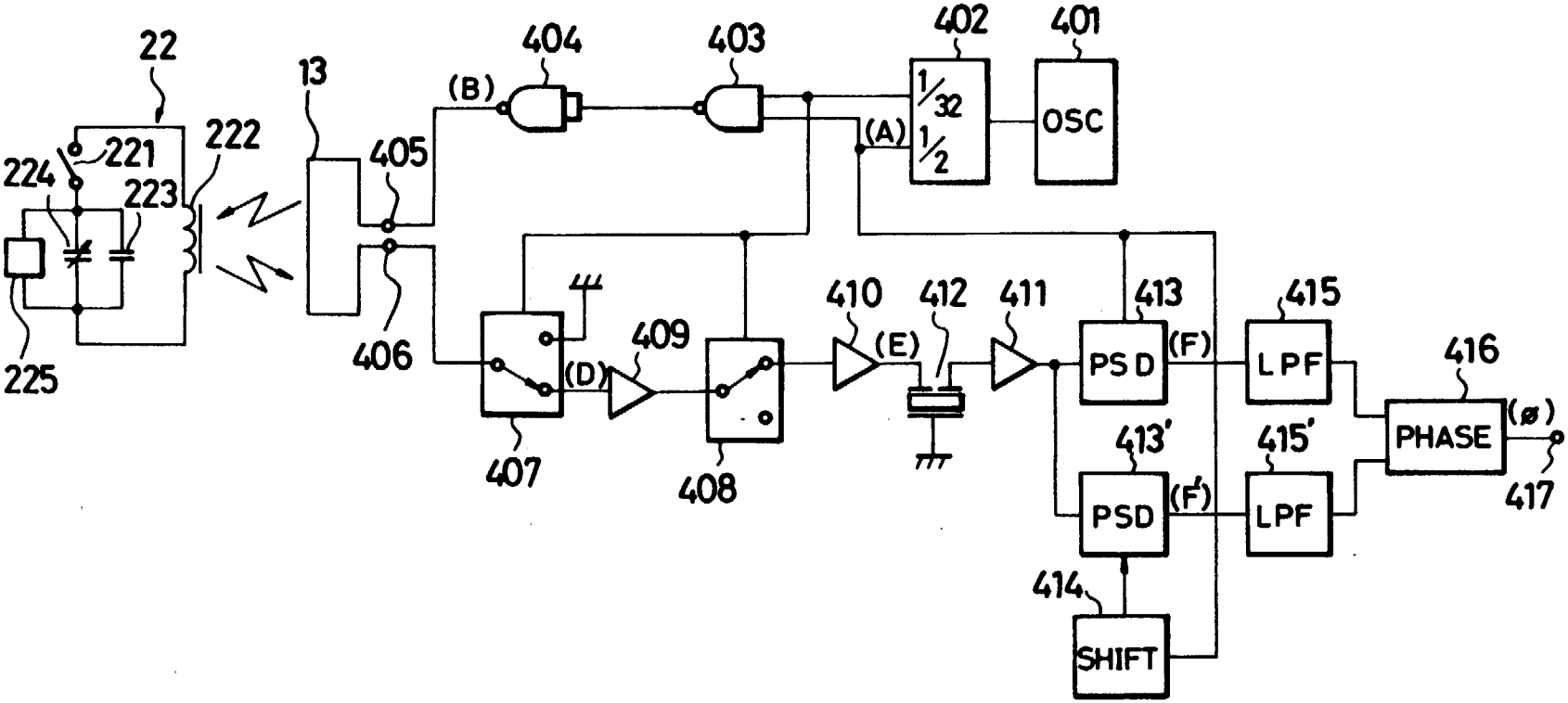
FIG. 13 is a block diagram of a timing control circuit thereof.

The switch 221 is arranged such that, when the core member 24 is pressed into the inside of the pen shaft 23 by, for instance, pressing a tip thereof against the surface of the tablet, the switch 221 is turned ON by being pressed from a rear end thereof via the coil spring 25. In addition, the capacity of the pressure capacitor is adapted to change by a pressing force of the core member 24, and is adapted to designate the size of a line to be drawn on the basis of a change in the capacity corresponding to the pressing force. In addition, as is also shown in FIG. 13, the capacitor 223, the variable capacitor 224, and the pressure variable capacitor 225 are connected to each other in parallel. One end of the coil 222 is connected to ends thereof via the switch 221, while the other end of the coil 222 is connected to the other ends thereof, thereby constituting the parallel resonance circuit 22.

It should be noted that the resonance circuit 22 is set by being adjusted by the variable capacitor 224 so as to resonate (to be tuned) with the frequency of radio waves transmitted from the antenna coil 13. Since the capacity of the pressure variable capacitor 225 changes, selectively $Q=R/(\omega_0 L)$ (where $\omega_0$ is an angular velocity of resonance; R is a value of resistance; and L is an inductance) changes, so that a phase shift occurs in the resonance circuit 22. At the same time, although a resonance frequency also changes, resonance is made possible.

FIG. 13 shows a detailed arrangement of the timing control circuit 4. In the drawing, reference numeral 401 denotes the oscillator (OSC); 402, the frequency demultiplication counter; 403, 404 denote NAND gates; 405 denotes the transmission terminal; 406, the reception terminal; 404, 408 denote reception changeover switches; 409, 410, 41, amplifiers; 412 denotes the filter; 413, 413' denote phase detectors (PSD); 414 denotes the phase shifter (SHIFT); 415, 415' denote the low-pass filters (LPF); 416 denotes a phase angle computing device (PHASE); and 417 an output terminal.

Figure 14:
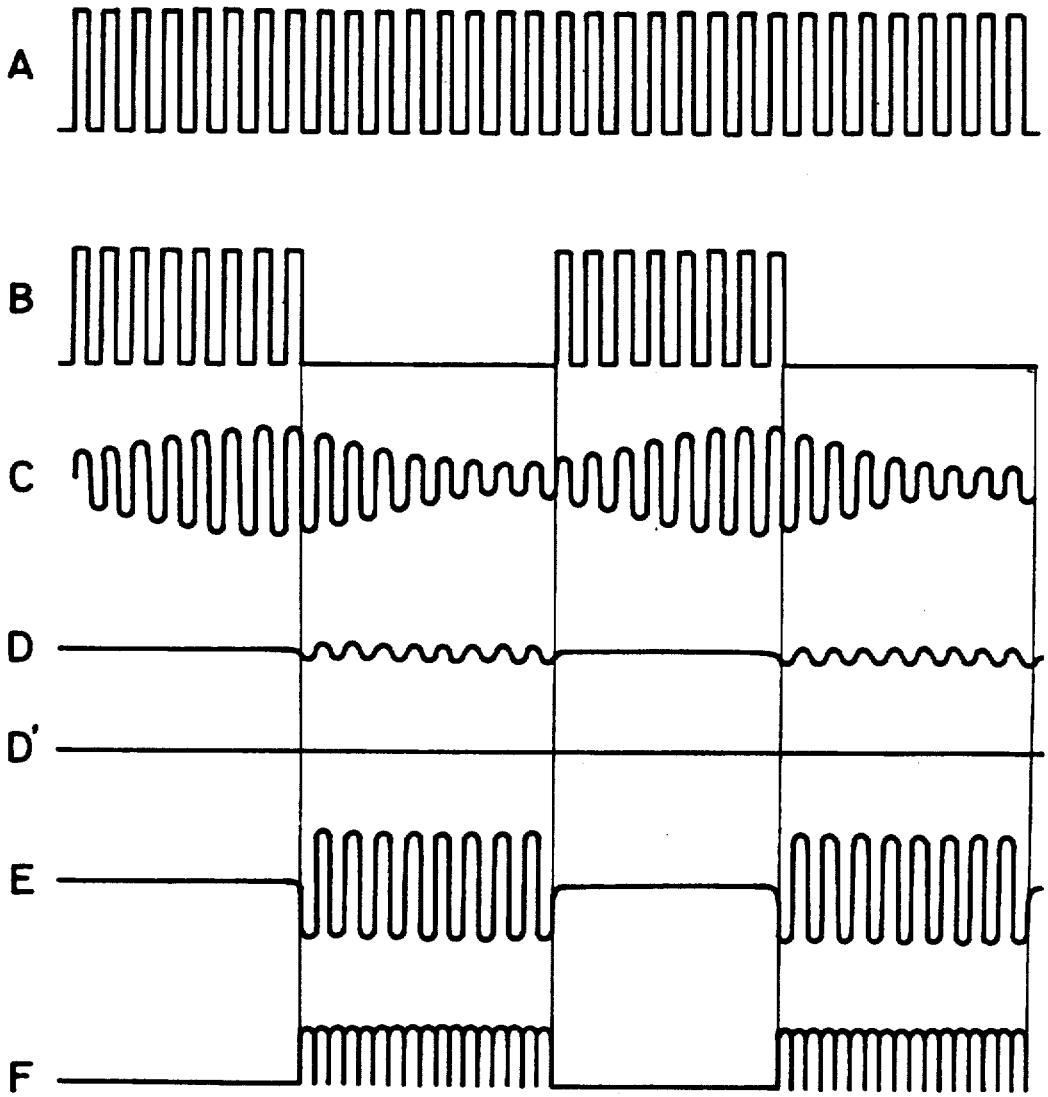
[FIG. 14 is a diagram illustrating waveforms of various sections shown in FIG. 13;]
Figure 15:
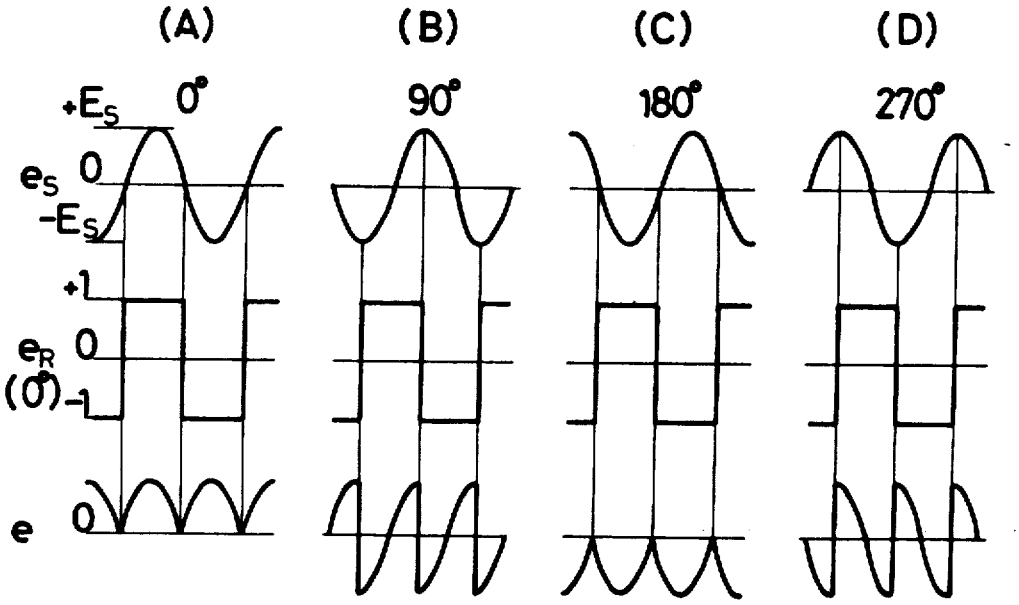
[FIGS. 15 and 16 are waveform diagrams illustrating the operation of phase detectors shown in FIG. 13; and]

FIG. 14 is a waveform diagram of signals in each section shown in FIG. 13. Hereafter, a detailed description will be made of operation.

A clock pulse of, say, 910 kHz generated by the oscillator 401 is divided into ½ and 1/32 by the frequency demultiplication counter 402. The pulse signal A of 455 kHz obtained by dividing the frequency into ½ is input to one input terminal of the NAND gate 403, while a pulse signal of 28.44 kHz (with a pulse width of 17.6 μs) obtained by dividing the frequency into 1/32 is input to the other input terminal. Its output is further sent to the NAND gate 404, and becomes the signal B in which a 455 kHz pulse signal is sent or is not sent for each 17.6 μs, as shown in FIG. 8.

The signal B is sent to the antenna coil 13 via the transmission terminal 405 and is transmitted as radio waves. At that juncture, for example, if the switch 221a is ON in the tuning circuit 22a of the input pen 2, the tuning circuit 22a resonates with the transmitted radio waves. Since the tuning circuit 22a continues to resonate while being attenuated while the transmission on the transmission side is stopped, the tuning circuit 22a generates the signal C as shown in FIG. 8, and the signal C is transmitted as radio waves by the coil 222 and is received by the antenna coil 13.

The reception changeover switches 407, 408, which have been changed over for each 17.6 μs by the aforementioned 28.44 kHz pulse signal, receive signals from the reception terminal 406 only during the period of suspension of transmission. The input signal becomes the signal D as shown in FIG. 8 if the switch 221a of the tuning circuit 22a is ON, while the input signal becomes the signal D' if it is OFF. The input signal D is amplified into the signal D by the amplifiers 408, 410, a component of noise is eliminated through the mechanical filter 412 having a resonance frequency of 455 kHz, and the signal is then is transmitted to the phase detector 413 via the amplifier 411. Incidentally, the amplifier 410 has an automatic level control function to set the signal E to a fixed amplitude.

The 455 kHz pulse signal A has already been input to the phase detector 413. At this juncture, since the phase of the input signal E is made to coincide with the phase of the pulse signal A, the signal F, in which a lower half of the signal E is inverted, as shown in FIG. 14, is output.

The shifter 414 has already advanced the pulse signal A by 90° and has imparted that signal to the phase detector 413. After receiving the signal E and the signal in which the signal A is advanced 90°, the phase detector 413 delivers an output to a signal F' which will be described below.

The signals F, F' are converted into flat signals by means of the filters 415, 415' having sufficiently low cut-off frequencies, and are input to the phase angle computing device 416.

Now, if it is assumed that a signal obtained by the frequency demultiplication by ½ of the frequency demultiplication counter 402 is $e_R$ as the input of the phase detector 413, and, referring to FIG. 15(A), since this is a square wave having an amplitude of 1, if an angular velocity thereof is assumed t be $\omega_R$, we have from the Fourier expansion the following formula:

$$e_R=(4/\pi)\{\sin \omega_R t+(\tfrac{1}{3}) \sin 3\omega_R t+(1/5) \sin 5\omega_R t+ \ldots\} \quad (7)$$

Furthermore, if it is assumed that a signal from the amplifier 411 is $e_i$, and that this signal is constituted by a synchronous component $e_S$ determined by a maximum value $E_S$ and an angular velocity $\omega_S$ as well as a nonsynchronous component $e_N$ which is noise and determined constituted by a maximum value $E_N$ and an angular velocity $\omega_N$, since the angular velocity $\omega_S=\omega_R$, we have $$e_i=e_S+e_N=E_S \sin \omega_R t+E_N \sin \omega_N t \quad (8)$$

When the signals $e_R$ and $e_S$ are of the same phase, if it is assumed that the output of the phase detector is $e_0$ (the signal F in FIGS. 13 and 14), we have $$\begin{aligned} e_0 = e_R \times e_i &= (4/\pi)\{E_S \sin \omega_R t\} \\ &\{\sin \omega_R t + (1/3)\sin 3\, \omega_R t + \ldots\} + \\ &(4/\pi)\{E_N \sin \omega_N t\}\sin \omega_R t + \\ &(1/3)\sin 3\, \omega_R t + \ldots\} \\ &= (4/\pi)\, E_S\, \{\sin^2 \omega_R t + \\ &(1/3)\sin \omega_R t \cdot \sin 3\, \omega_R t + \ldots\} + \\ &(4/\pi)\, E_N\, \{\sin \omega_N t \cdot \sin \omega_R t + \\ &(1/3)\sin \omega_N t \cdot \sin 3\, \omega_R t + \ldots\} \end{aligned} \quad (9)$$

Here, since a DC component is included only in the first term $\sin^2 \omega_R t$, and the remainder is an AC component, if we focus our attention only on the DC component as the output of the low-pass filter 414 to which the output of the phase detection is imparted and if that output is assumed to be $\overline{e_0}$, from $\sin^2 \omega_R t=(\tfrac{1}{2})\{1-\cos 2\omega_R t\}$, we have $$\overline{e_0}=(2/\pi)E_S \quad (10)$$

Formula (10) shows a mean value of the signal $e_0$ in FIG. 15(A).

Next, when the capacity of the pressure variable capacitor 225 changes, and when the phase difference $\phi$ occurs between the signals $e_R$ and $e_S$, and if the first term of Formula (9) is assumed to be $e'_0$, we have $$\overline{e'_0}=(4/\pi)E_S\{\sin (\omega_R t=\phi) \sin \omega_R t\}=(4/\pi)E_S(\tfrac{1}{2})\{\cos \phi-\cos (2\omega_R t+\phi)\} \quad (11)$$

Since the second term is an AC component, the DC output $e_0$ becomes as follows:

$$\overline{e_0}=(2/\pi)E_S \cos \phi \quad (12)$$

If it is assumed that $\phi=180°$, we have $$\overline{e_0}=-(2/\pi)E_S$$

Formula (12) shows a mean value of the signal $e_0$ in FIG. 15(C), and the signal $\overline{e_0}$ is input to the phase angle computing device 416.

Figure 16:
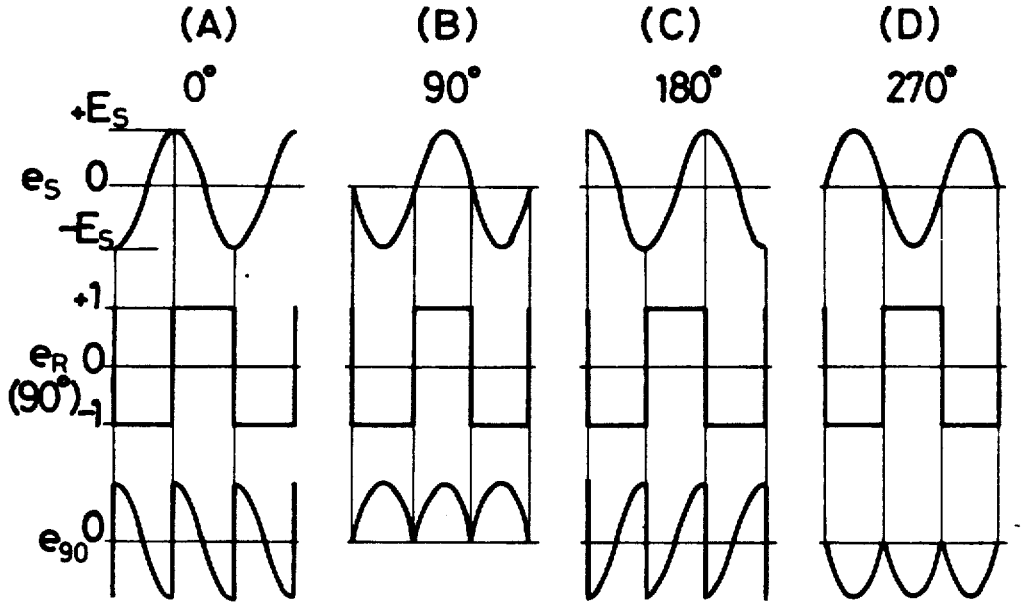

Considered next are cases where the phase differences of the signal $e_S$ with respect to the signal $e_R$ have become 0°, 90°, 180°, and 270°, respectively, as shown in FIG. 15(A), (B), (C), and (D). For instance, with respect to the phase differences of 90° and 270°, $E_0$ equals zero if it is assumed that $\phi$ in Formula (12) equals 90° or 270°. Accordingly, in order to detect the signal $e_0$ including the region of these phase differences, the signal $e_R$ is advanced 90° by the shifter 414, as shown in FIG. 16. Consequently, $\cos \phi$ in Formula (12) is replaced by $\sin \phi$, and if the mean value of a signal $e_{90}$ (the signal F' in FIG. 13) shown in FIG. 16 is this case is assumed to be $e_{90}$, the following formula is derived $$\overline{e_{90}}=(2/\pi)E_S \sin \phi \quad (13)$$

and the signal $e_{90}$ is input to the phase angle computing device 417. The phase angle computing device 416 computes the phase angle from Formulae (12) and (13). Since $e_{90}/e_0=\sin \phi/\cos \phi$, we have $$\phi=\tan^{-1}(\overline{e_{90}}/\overline{e_0}) \quad (14)$$

thus a signal with a phase angle $\phi$ of Formula (14) is output from the output terminal 417 to a microcomputer (not shown) accommodated in the tablet 1.

It should be noted that although, in this embodiment, the responding phase of the tuning circuit 22 is altered by the pressure variable capacitor 225, an alternative arrangement may be provided such that variable resistor by the use of pressure sensitive rubber or the like may be employed, or the inductance of the coil 222 may be made variable.

Figure 17:
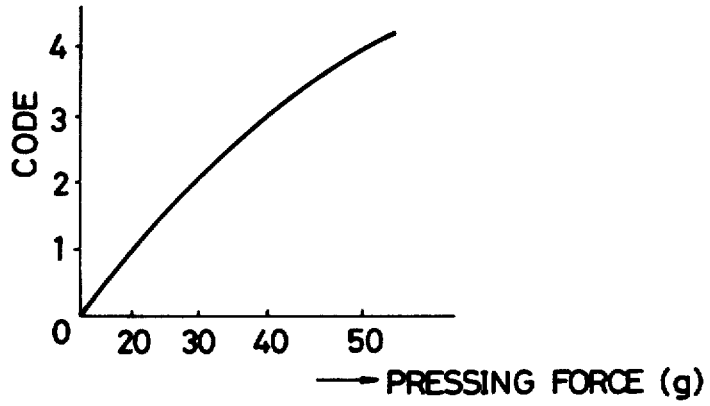
FIG. 17 is a diagram illustrating relationships between a pressing force of a core member and the size of a line.

FIG. 17 is a diagram illustrating the relationships between a pressing force (g) of the core member 24 and codes for designating the size of a line to be drawn. A signal representing a phase angle $\phi$ and output from the output terminal 417 in correspondence with an analog-like pressing force is converted by the microcomputer into a digital code which designates the size of a line, and the size is thus designated. Incidentally, when the pressing force is zero, both signals $\overline{e_0}$, $\overline{e_{90}}$ in Formula (14) become zero, so that the phase angle $\phi$ becomes inconstant. The phase angle computing device 416 detects that inconstancy, and discrimination is made that the switch 221 is OFF. In carrying out this discrimination, thresholds which slightly exceed zero may be provided for the signals $\overline{e_0}$, $\overline{e_{90}}$, and a logical sum of the result of comparison with the thresholds may be monitored. If a definition is given that when the phase angle $\phi$ is thus detected, it is a pen-down state, and that when it is inconstant, it is not a pen-down state, and if the discriminated signal is sent to the phase detection circuit 3, it is possible to input a position by operating the input pen 2 on the tablet 1 and simply by pressing the tip of the input pen 2 against the tablet at a position where coordinates are to be input.

What is claimed is:

1. A coordinates input system having a tablet constituting a coordinates input portion, a position designating device such as a stylus pen, and a position detection circuit adapted to drive said tablet and detect a position at which coordinates are input by said position designating device, said system comprising:

an antenna coil disposed around a coordinates input range of said tablet; and a tuning circuit disposed in said position designating device and including a coil and a capacitor, wherein radio waves are generated by said antenna coil by application of an AC signal of a predetermined frequency thereto, and the status of said tuning circuit is discriminated by a signal of said antenna coil at the time when the transmission of said radio waves is suspended, thereby detecting the status of said position designating device.

2. A coordinates input system according to claim 1, wherein switching means for turning ON (or OFF) the connection between said coil and said capacitor is disposed in said tuning circuit, and when only a position of coordinates to be input is designated, said position designating device is used by turning said switching means ON (or OFF).

3. A coordinates input system according to claim 1, wherein said tablet is arranged such that a tablet body and said antenna coil are accommodated in a casing made of a non-metallic material, such as a synthetic resin.

4. A coordinates input system according to claim 1, further comprising a magnetism generator for designating a position.

5. A coordinates input system according to claim 1, wherein said antenna coil is arranged such that a conductive wire provided with an insulation coating, such as polyvinyl chloride, is disposed around said coordinates input range of said tablet.

6. A coordinates input system according to claim 1, wherein said tuning circuit includes a variable capacitor.

7. A coordinates input system having a tablet constituting a coordinates input portion, a position designating device such as a stylus pen, and a position detection circuit adapted to drive said tablet and detect a position at which coordinates are input by said position designating device, said system comprising:

a plurality of tuning circuits disposed in said position designating device, each of said plurality of tuning circuits including a coil and a capacitor to constitute a set and being adapted to transmit radio waves with mutually equivalent tuning frequencies and different phases in response to an external signal;

switching means disposed in said position designating device and adapted to turn ON and OFF the connection between said coil and said capacitor of each of said tuning circuits; and an antenna coil disposed around a coordinates input range of said tablet;

wherein radio waves are generated by said antenna coil when an AC signal of a frequency identical with that of said tuning frequency is intermittently applied to said antenna coil, and the status of the position and operation of said position designating device is detected when signals responded to by said tuning circuits during suspension of transmission of said radio waves are received by said antenna coil, and the ON-OFF status of said switching means with respect to said tuning circuits is discriminated by means of input signals having mutually different phases with respect to output signals of said antenna coil.

8. A coordinates input system having a tablet constituting a coordinates input portion, a position designating device such as a stylus pen, and a position detection circuit adapted to drive said tablet and detect a position at which coordinates are input by said position designating device, said system comprising:

a tuning circuit disposed in said position designating device, said tuning circuit including a set of a coil, a capacitor, and/or a resistor and being adapted to generate radio waves with mutually equivalent tuning frequencies and a change in the phase in response to an external signal by changing any of the values of said coil, said capacitor, and/or said resistor in correspondence with the status of use of said position designating device; and an antenna coil disposed around a coordinates input range of said tablet;

wherein radio waves are generated by said antenna coil when an AC signal of a frequency identical with that of said tuning frequency is intermittently applied to said antenna coil, and the status of the position and operation of said position designating device is detected when signals responded to by said tuning circuit during suspension of transmission of said radio waves are received by said antenna coil, and the status of use of said position designating device is discriminated by means of input signals having mutually different phases with respect to output signals of said antenna coil.

*9. An implement for designating one of plural characteristics thereof and a position thereof to a tablet including means for signalling indications of the implement characteristic and position comprising*

*a cordless housing adapted to be manually held and manually moved proximate a surface of the tablet, the housing including:*

*a tuned circuit having no electric power supply connected to it, the tuned circuit including*

*reactance means including several reactances comprising an inductor and a capacitor, and*

*plural manually activated switches for connecting said several reactances together in different combinations to provide plural resonant frequencies for the tuned circuit in response to different ones of the plural manually activated switches being activated to signal a selected characteristic;*

*the housing being constructed so that waves having a magnetic component can be coupled without wires between a reactance of the tuned circuit and a structure outside of the housing.*

*10. The implement of claim 9 wherein the variable reactance includes a variable capacitor.*

*11. The implement of claim 9 wherein the switch means is activated in response to the implement region bearing against the tablet surface.*

*12. The implement of claim 9 wherein the switch means is manually activated.*

*13. An implement for signalling position thereof to position detecting coils for a tablet associated with a surface with which the implement is adapted to be moved comprising:*

*a cordless housing adapted to be manually held and manually moved relative to the surface, the housing including:*

*a region adapted to be moved relative to the surface,*

*a tuned circuit having no electric power supply connected to it, the tuned circuit including*

*reactance means comprising an inductor, a capacitor and a variable reactance having at least several reactance values correlated with at least several pressure values of a region of the implement being urged against the surface;*

*the housing being constructed so that waves having a magnetic component can be coupled without wires between a reactance of the tuned circuit and a structure outside of the housing; and*

*means in proximity to the region for generating and supplying a magnetic field to the position detecting coils for the implement.*

*14. The implement of claim 13 wherein a fixed capacitor is connected in circuit with said variable reactance.*

*15. The implement of claim 13 wherein the field generating and supplying means comprises a magnet.*

*16. The implement of claim 13 wherein the housing is formed as a writing pen.*

*17. In combination,*

*a tablet including position detecting coils arranged in two coordinate directions,*

*a manually held implement having a region adapted to be moved relative to a surface of the tablet associated with the position detecting coils, the implement including:*

*a cordless housing adapted to be manually held and manually moved relative to the surface, the housing including:*

*a tuned circuit having no electric power supply connected to it, the tuned circuit including*

*an inductor and a capacitor, and*

*a variable reactance having a reactance value responsive to the pressure exerted by said region against the surface;*

*the housing being constructed so that waves having magnetic components can be coupled without wires between a reactance of the tuned circuit and a structure outside of the housing,*

*means in proximity to the region for generating and supplying a magnetic field to the position detecting coils for the implement; and*

*means responsive to the magnetic field coupled between the implement and the coils for signalling the position of the implement relative to the two coordinate directions, the signalling means responding to variations of the variable reactance to indicate the width of a line as a function of implement position on the surface.*

*18. The combination of claim 17 wherein the housing is formed as a writing pen.*

*19. The combination of claim 17 wherein the variable reactance has at least several values correlated with at least several of said exerted pressures, the signalling means responding to the at least several values of the reactance to indicate which of the at least several pressures is being exerted.*

*20. In combination,*

*a tablet including position detecting coils arranged in two coordinate directions, a markable surface superposed with said tablet in said two coordinate directions,*

*a manually held implement for changing markings on the display surface including*

*an inductor and a capacitor, and*

*a switch activated while a region of the implement is proximate the surface for connecting the capacitor and inductor in circuit with each other so that the tuned circuit has a predetermined resonant frequency;*

*the housing being constructed so that waves having a magnetic component can be coupled without wires between a reactance of the tuned circuit and a structure outside of the housing,*

*means in proximity to the region for generating and supplying a magnetic field to the position detecting coils for the implement, the position detecting coils being in proximity to and associated with the display, and*

*means responsive to the magnetic field coupled between the implement and the coils while the switch is activated for signalling the position of the implement relative to the two coordinate directions.*

*21. The combination of claim 20 wherein the tuned circuit includes a variable reactance having a reactance value responsive to the pressure exerted by said region against the surface, wherein the signalling means responds to variations of the variable reactance to indicate the pressure of the implement on the surface as a function of implement position on the surface.*

*22. The combination of claim 21 wherein the variable reactance has at least several values responsive to at least several pressures exerted by said region against the surface.*

*23. The combination of claim 20 wherein the housing is formed as a writing pen.*

*24. The combination of claim 20 wherein said implement has different characteristics associated with it, said housing further including:*

*(a) a plurality of said tuned circuits, each of said tuned circuits having reactances with different values, and*

*(b) switch means for selectively connecting the reactances of the different plural tuned circuits in circuit with each other as a function of the selected characteristic of the implement.*

*25. The combination of claim 20 wherein the switch is activated in response to the region being urged against the surface.*

*26. A method of identifying which one of plural characteristics is possessed by an object in proximity to a coil and determining the location of the object, each of the characteristics being associated with different valued reactances of a tuned circuit on the object so that different tuned circuits are associated with different characteristics, the different valued reactances causing the tuned circuit to couple waves including a magnetic component and having different angular modulations with the coil, the method comprising the steps of supplying the coil with AC energy including a predetermined frequency, coupling the energy from the coil to the tuned circuit on the object, the tuned circuit on the object interacting with the energy coupled with it as a function of the value of the reactances of the tuned circuit so that there is a different angular modulation of the waves coupled between the coil and the tuned circuit as a function of the characteristics associated with the different tuned circuits and the predetermined frequency, detecting the angular modulation of the waves coupled between the coil and the tuned circuit to identify the characteristic of the object, and detecting the position of the object by coupling energy between the object and a region including the coil, said region including a two dimensional array of detectors that interact with the coupled energy.*

*27. The method of claim 26 wherein the energy at the predetermined frequency is coupled from the coil to the tuned circuit on the object during a first interval and the wave having angular modulation is coupled from the tuned circuit on the object to the coil during a second interval while the energy at the predetermined frequency is not coupled to the coil.*

*28. The method of claim 27 wherein the angular modulation is phase modulation and the detecting step includes detecting the phase of the phase modulation of the electric wave coupled to the coil during the second interval.*

*29. A method of identifying a characteristic of an implement from one of plural different characteristics, the implement including: (a) means for modifying markings on a display surface while a region of the implement is proximate the display surface and (b) a tuned circuit with com-*

*ponents selectively connected to each other to have a predetermined resonant frequency while the region of the implement is proximate the surface, the identified characteristic being associated with a tuned circuit having one of plural reactance combinations, each of said plural different characteristics being associated with one of said plural reactance combinations,*

*the method comprising*

*modifying the markings on the display surface by moving the region proximate the display surface while the reactances are connected to each other in one of said reactance combinations to provide a tuned circuit having the resonant frequency,*

*determining which one of the reactance combinations the tuned circuit has by coupling a wave having a magnetic component at the resonant frequency between a coil and the tuned circuit, the tuned circuit interacting with the wave coupled with it as a function of the value of the reactances of the tuned circuit so that there is different angular modulation of the wave coupled between the coil and the tuned circuit is a function of the characteristics associated with the different tuned circuits and the predetermined frequency, and*

*detecting the angular modulation of the waves coupled between the coil and the tuned circuit to identify the characteristic of the implement being moved proximate the display surface.*

*30. The method of claim 29 wherein the wave is coupled from a source of the frequency to the tuned circuit.*

*31. The method of claim 30 wherein the wave is coupled from the source to the tuned circuit during a first interval and the angle modulated wave is coupled from the tuned circuit to a detector for the predetermined frequency during a second interval.*

*32. The method of claim 31 further including the step of detecting the position of the object by coupling energy between the object and a region including the surface, said region including a two dimensional array of detectors that interact with the coupled energy.*

*33. The method of claim 29 further including the step of detecting the position of the object by coupling energy between the object and a region including the surface, said region including a two dimensional array of detectors that interact with the coupled energy.*

*34. In combination, a coil, an object having one of plural different predetermined characteristics, the object being adapted to be selectively in proximity to the coil, the object including a tuned circuit having a predetermined resonant frequency, different one of said characteristics being associated with different combinations of reactances of the tuned circuit, means for supplying AC energy at the resonant frequency to the coil, the tuned circuit on the object in proximity to the coil interacting with a wave including a magnetic component resulting from the energy coupled to the coil as a function of the value of the reactances of the tuned circuit so that there is different angular modulation of the waves coupled between the coil and the turned circuit as a function of the characteristics associated with the different tuned circuits and the predetermined frequency, means for detecting the angular modulation of the waves coupled between the coil and the tuned circuit to identify the characteristic of the object, and means for detecting the position of the identified object, said position detecting means coupling energy between the object and a region including the coil, said region including a two-dimensional array of detectors for interacting with the coupled energy.*

*35. The combination of claim 34 wherein the modulation is detected by supplying the coil during a first interval with the AC energy at the predetermined frequency, the means for detecting being activated to be responsive to energy coupled back to the coil from the tuned circuit during a second interval while the coil is not supplied with the AC energy at the one predetermined frequency.*

*36. The combination of claim 34 wherein the object is in the form of a pen.*

*37. The combination of claim 34 wherein said object further includes:*

*(a) a plurality of said tuned circuits, each of said tuned circuits having reactances with different values, and*

*(b) switch means for selectively connecting the reactances of the different plural tuned circuits in circuit with each other as a function of a selected characteristic of the object.*

*38. The combination of claim 34 further including a surface in proximity to the coil, the object including*

*a cordless housing adapted to be manually held and manually moved relative to the tablet, the housing including:*

*means positioned in a region thereof adapted to be moved proximate the tablet,*

*the tuned circuit having no electric power supply connected to it, the tuned circuit including*

*an inductor and a capacitor, and*

*a switch activated in response to the region being proximate the tablet for connecting the capacitor and inductor in circuit with each other so that the tuned circuit has a predetermined resonant frequency;*

*the housing being constructed so that waves having magnetic components can be coupled without wires between a reactance of the tuned circuit and a structure outside of the housing.*

*39. The combination of claim 38 wherein the switch is activated in response to the region being urged against the surface.*

*40. Apparatus for determining which one of plural different characteristics is possessed by an object in a region and the position of the object, different ones of said characteristics being associated with different tuned circuit combinations of reactances, each of said tuned circuit combinations having a different resonant frequency, comprising a coil in the region, means for supplying AC energy at the resonant frequency to the coil, the tuned circuit on said object in proximity to the coil interacting with an electric wave resulting from the energy coupled to the coil as a function of the value of the reactances of the tuned circuit so that there is a different angular modulation of the waves coupled between the coil and the tuned circuit as a function of the characteristics associated with the different tuned circuits and the frequency of the supplied AC energy, means for detecting the angular modulation of the wave coupled between the coil and the tuned circuit to identify the characteristic of the object, and means for detecting the position of the identified object, said position detecting means coupling energy between the object and a region including the coil, said region including a two-dimensional array of detectors for interacting with the coupled energy.*

*41. The apparatus of claim 40 wherein the modulation is detected by supplying the coil during a first interval with the AC energy at the predetermined frequency, the means for detecting being activated to be responsive to energy coupled back to the coil from the tuned circuit during a second interval while the coil is not supplied with the AC energy at the one predetermined frequency.*

*42. Apparatus for determining the position of and which one of plural characteristics is included in an implement positioned proximate a detecting surface, the implement including a tuned circuit having a predetermined resonant frequency identifying the characteristic, different tuned circuits with different combinations of reactances being associated with the different characteristics, comprising*

*a tablet in the region for coupling energy to the implement,*

*a coil associated with the tablet for supplying AC energy at the resonant frequency to the tuned circuit, the tuned circuit on the implement causing angle modulation of the current flowing in the coil, the angle modulation being different for different ones of said tuned circuits to provide an identification of the different characteristics, and* means for sensing the angle modulation of the current flowing in the coil and responding to the sensed angle modulation for indicating the identified characteristic associated with the tuned circuit and responsive to energy coupled between the tablet and the implement for indicating the position of the implement on the tablet.

*43. The apparatus of claim 42 wherein the angle modulation is detected by supplying the coil during a first interval with the AC energy at the predetermined frequency, the means for sensing being activated to be responsive to energy coupled back to the coil from the tuned circuit during a second interval while the coil is not supplied with the AC energy at the predetermined frequency.*

*44. In combination, a position sensing tablet, a coil associated with the tablet, an implement having one of plural characteristics adapted to be selectively placed proximate the tablet, the tablet and the implement having structures for coupling energy between them, the implement including a tuned circuit having a predetermined resonant frequency, different tuned circuits with different combinations of reactances associated with the different characteristics, means for supplying AC energy at the predetermined resonant frequency to the tuned circuit, the tuned circuit on the implement causing angle modulation of the current flowing in the coil, the angle modulation being different for different ones of said tuned circuits to provide an identification of the different characteristics, and* means for sensing the angle modulation of the current flowing in the coil and responding to the sensed angle modulation for indicating the identified characteristic associated with the tuned circuit and responsive to energy coupled between the tablet and the implement for indicating the position of the implement on the tablet.

*45. The combination of claim 44 wherein the change is detected by supplying the coil during a first interval with the AC energy at the predetermined frequency, the means for sensing being activated to be responsive to energy coupled back to the coil from the tuned circuit during a second interval while the coil is not supplied with the AC energy at the one predetermined frequency.*

*46. A method of determining the position of an implement on a tablet, the implement including a tuned circuit with a predetermined resonant frequency and a variable reactance connected in circuit with the tuned circuit, the variable reactance having at least several values that change as a function of at least several pressures exerted by the implement on a surface proximate the tablet, the tablet including a coil, comprising the steps of:*

*exciting the coil with AC energy having approximately the same frequency as the resonant frequency, the tuned circuit interacting with the AC energy to change the AC current flowing in the coil as a function of the at least several exerted pressures, detecting the position of the implement on the tablet in response to an energy field coupled between the tablet and the implement, and responding to the AC current flowing in the coil and the detected implement position to indicate the value of the at least several exerted pressures at the detected implement positions on the surface.*

*47. The method of claim 46 wherein the exerted pressure is indicated by detecting angle modulation imposed on the current flowing in the coil in response to the interaction between the AC energy and the tuned circuit.*

*48. The method of claim 46 wherein the exerted pressure is indicated by detecting phase modulation imposed on the current flowing in the coil in response to the interaction between the AC energy and the tuned circuit.*

*49. The method of claim 46 wherein the coil is excited during a first interval with the AC energy at the predetermined frequency, and the indication is derived by responding to energy coupled back to the coil from the tuned circuit during a second interval while the coil is not excited by the AC energy at the predetermined frequency.*

*50. Apparatus for signalling the width of a trace resulting from an implement being moved relative to and against a surface, the implement including a region adapted to be moved across and against the surface and a tuned circuit having a resonant frequency, the circuit including a variable reactance controlled in response to the width of a trace produced in response to the pressure of the region on the surface, the apparatus including a coil in proximity to the surface, means for energizing the coil with an AC wave having substantially the same frequency as the resonant frequency, the tuned circuit interacting with the AC wave to angle modulate the AC wave as a function of the width of the trace, and means for detecting the angle modulation of the angle modulated AC wave to indicate trace width.*

*51. The apparatus of claim 50 wherein the means for indicating exerted pressure includes means for detecting angle modulation imposed on the current flowing in the coil in response to the interaction between the AC energy and the tuned circuit.*

*52. The apparatus of claim 50 wherein the means for indicating exerted pressure includes means for detecting phase modulation imposed on the current flowing in the coil in response to the interaction between the AC energy and the tuned circuit.*

*53. The apparatus of claim 50 wherein the angle modulation is detected with a detector responsive to the angle modulation of angle modulated current flowing in the coil in response to the interaction between the AC wave and the tuned circuit.*

*54. The apparatus of claim 53 wherein the coil is energized with the resonant frequency during a first interval and the detector is responsive to the angle modulated current during a second interval while the coil is not energized with the resonant frequency.*

*55. The implement of claim 50 wherein the reactance is responsive to the pressure exerted by the region on the surface so that the modulation is a function of the pressure exerted by the region against the surface.*

*56. The apparatus of claim 50 wherein the variable reactance has at least several values corresponding to at least several trace widths so that the angle modulation has at least several values, the means for detecting indicating the value of the at least several angle modulated values.*

*57. A method of signalling the width of a trace resulting from an implement being moved relative to and against a*

*surface, the implement including a region adapted to be moved across and against the surface and a tuned circuit having a resonant frequency, the circuit including a variable reactance controlled in response to the width of a trace produced by the region on the surface, comprising energizing a coil in proximity to the surface with an AC wave having substantially the same frequency as the resonant frequency, the tuned circuit interacting with the AC wave to angle modulate the AC wave as a function of the width of the trace resulting from the region being pressed on the surface, and detecting the angle modulation of the angle modulated AC wave to indicate trace width.*

*58. The method of claim 57 wherein the angle modulation is detected by detecting the angle modulated current flowing in the coil in response to the interaction between the AC wave and the tuned circuit.*

*59. The method of claim 58 wherein the coil is energized with the resonant frequency during a first interval and the angle modulation of the angle modulated current is detected during a second interval while the coil is not energized with the resonant frequency.*

*60. The method of claim 57 wherein the reactance is responsive to the pressure exerted by the region on the surface so that the modulation is a function of the pressure exerted by the region against the surface.*

*61. In combination,*

*an implement including a region adapted to be moved across a surface and a tuned circuit having a resonant frequency, the circuit including a variable reactance controlled in response to the width of a trace resulting from the region being on the surface,*

*apparatus for signalling the width of the trace resulting from the implement being on the surface, the apparatus including:*

*a coil in proximity to the surface,*

*means for energizing the coil with an AC wave having substantially the same frequency as the resonant frequency, the tuned circuit interacting with the AC wave to angle modulate the AC wave as a function of the width of the trace produced by the region on the surface, and*

*means for detecting the angle modulation of the angle modulated AC wave to indicate line width.*

*62. The combination of claim 61 wherein the angle modulation is detected with a detector responsive to the angle modulation of angle modulated current flowing in the coil in response to the interaction between the AC wave and the tuned circuit.*

*63. The combination of claim 62 wherein the coil is energized with the resonant frequency during a first interval and the detector is responsive to the angle modulated current during a second interval while the coil is not energized with the resonant frequency.*

*64. The combination of claim 61 further including means for indicating the position of the implement and the accompanying detected pressure on the surface.*

*65. The implement of claim 61 wherein the reactance is responsive to the pressure exerted by the region on the surface so that the modulation is a function of the pressure exerted by the region against the surface.*

*66. In combination, a coil, an object having one of plural different predetermined characteristics, the object being adapted to be selectively in proximity to the coil, the object including a tuned circuit having a predetermined resonant frequency, different ones of said characteristics being associated with different combinations of reactances of the tuned circuit, means for supplying AC energy at the resonant frequency to the coil, the tuned circuit on the object in proximity to the coil interacting with a wave including a magnetic component resulting from the energy coupled to the coil as a function of the value of the reactances of the tuned circuit so that there is different angular modulation of the waves coupled between the coil and the tuned circuit as a function of the characteristics associated with the different tuned circuits and the predetermined frequency, and means for detecting the angular modulation of the waves coupled between the coil and the tuned circuit to identify the characteristic of the object, the object further including means for generating and supplying a field including a magnetic component to a tablet including two-coordinate position detecting coils for the object, the position detecting coils responding to the field to signal the object position.*

*67. In combination, a coil, an object in the form of a pen having one of plural different predetermined characteristics, the object being adapted to be selectively in proximity to the coil, the object including a tuned circuit having a predetermined resonant frequency, different ones of said characteristics being associated with different combinations of reactances of the tuned circuit, means for supplying AC energy at the resonant frequency to the coil, the tuned circuit on the object in proximity to the coil interacting with a wave including a magnetic component resulting from the energy coupled to the coil as a function of the value of the reactances of the tuned circuit so that there is different angular modulation of the waves coupled between the coil and the tuned circuit as a function of the characteristics associated with the different tuned circuits and the predetermined frequency, and means for detecting the angular modulation of the waves coupled between the coil and the tuned circuit to identify the characteristic of the object.*

*68. In combination, a position detecting tablet including a coil, an object having one of plural different predetermined characteristics, the object being adapted to be selectively in proximity to the coil, the object including a tuned circuit having a predetermined resonant frequency, different ones of said characteristics being associated with different combinations of reactances of the tuned circuit, means for supplying AC energy at the resonant frequency to the coil, the tuned circuit on the object in proximity to the coil interacting with a wave including a magnetic component resulting from the energy coupled to the coil as a function of the value of the reactances of the tuned circuit so that there is different angular modulation of the waves coupled between the coil and the tuned circuit as a function of the characteristics associated with the different tuned circuits and the predetermined frequency, and means for detecting the angular modulation of the waves coupled between the coil and the tuned circuit to identify the characteristic of the object,*

*the object including*

*a cordless housing adapted to be manually held and manually moved relative to the tablet, the housing including:*

*means positioned in a region thereof adapted to be moved proximate the tablet,*

*the tuned circuit having no electric power supply connected to it, the tuned circuit including*

*an inductor and a capacitor, and*

*a switch activated in response to the region being proximate the tablet for connecting the capacitor and inductor in circuit with each other so that the tuned circuit has a predetermined resonant frequency;*

*the housing being constructed so that waves having magnetic components can be coupled without wires be-*

*tween a reactance of the tuned circuit and a structure outside of the housing.*

*69. In combination, a coil, an object having one of plural different predetermined characteristics, the object being adapted to be selectively in proximity to the coil, the object including a tuned circuit having a predetermined resonant frequency, different ones of said characteristics being associated with different combinations of reactances of the tuned circuit, means for supplying AC energy at the resonant frequency to the coil, the tuned circuit on the object in proximity to the coil interacting with a wave including a magnetic component resulting from the energy coupled to the coil as a function of the value of the reactances of the tuned circuit so that there is different angular modulation of the waves coupled between the coil and the tuned circuit as a function of the characteristics associated with the different tuned circuits and the predetermined frequency, and means for detecting the angular modulation of the waves coupled between the coil and the tuned circuit to identify the characteristic of the object, the object further including means for generating and supplying a field including a magnetic component to a tablet including two-coordinate position detecting coils for the object, the position detecting coils responding to the field to signal the object position.*

*70. A manually held implement adapted to be urged against a surface comprising:*

*a cordless housing shaped as a writing pen adapted to be manually held and manually moved on the surface, the housing including:*

*a region adapted to be moved across the surface,*

*a tuned circuit having no electric power supply connected to it, the tuned circuit including*

*a variable pressure responsive reactance coupled to the region so that the width of a trace resulting from the region being on the surface is determined by the value of the variable reactance, the housing being constructed so that waves having a magnetic component are coupled without wires between a reactance of the tuned circuit and a structure outside of the housing.*

*71. A signalling method comprising moving a region of an implement including a tuned circuit having a resonant frequency against a surface, varying the value of a reactance of the tuned circuit in response to the pressure exerted by the region on the surface as the implement is being moved relative to the surface, energizing a coil in proximity to the surface with an AC wave having substantially the same frequency as the resonant frequency, the tuned circuit interacting with the AC wave to angle modulate the AC wave as a function of the pressure exerted by the region on the surface, and detecting the angle modulation of the angle modulated AC wave to indicate the exerted pressure.*

*72. The method of claim 71 wherein the detected exerted pressure is commensurate with the width of a trace resulting from the region being pressed against the surface.*

*73. The method of claim 72 further including detecting the position of the region on the surface accompanying the detected trace width.*

*74. The method of claim 71 further including detecting the position of the region on the surface accompanying the detected exerted pressure.*

*75. A method of detecting the status of an implement in a coordinate input device comprising:*

*emitting a wave having a magnetic component from an emitting means of a position detecting tablet,*

*responding to the emitted wave to excite a tuned circuit in a position designating implement, the tuned circuit when excited emitting a wave having a frequency determined by the resonant frequency of the tuned circuit,*

*receiving a wave having a magnetic component in a wave receiving means of said tablet, and*

*deriving an indication of the status of said position designating implement in response to the received wave being the wave emitted by the tuned circuit, said waves emitted from and received by the tablet being emitted and received in the same loop coil.*

*76. The method of claim 75 wherein said waves emitted from and received by the tablet are alternately emitted and received.*

*77. A method of detecting a pen-*down status of a stylus in a coordinate input device comprising:

*emitting a wave having a magnetic component from an emitting means of a position detecting tablet,*

*responding to the emitted wave to excite a tuned circuit in a position designating implement, the tuned circuit when excited emitting a wave having a frequency determined by the resonant frequency of the tuned circuit,*

*receiving a wave having a magnetic component in a wave receiving means of said tablet, and*

*deriving an indication that the stylus is in a pen-*down status in response to the received wave being the wave emitted by the tuned circuit, said waves emitted from and received by the tablet being emitted and received in the same loop coil.

*78. The method of claim 77 wherein said waves emitted from and received by the tablet are alternately emitted and received.*

*79. A method of determining which of plural switches is being operated in a position designating implement of a coordinate input device, each of the switches being associated with a different resonant frequency of a tuned circuit means, comprising:*

*emitting a wave having a magnetic component from an emitting means of a position detecting tablet,*

*responding to the emitted wave to excite the tuned circuit means as a function of which of the switches is operated by handling, the resonant circuit when excited emitting a wave having a frequency determined by the activated switch,*

*receiving the wave emitted by the tuned circuit means in a wave receiving means of said tablet, and*

*detecting which resonant circuit emits the wave received by said wave receiving means to determined which switch is being operated.*

*80. The method of claim 79 wherein said waves emitted from and received by the tablet are emitted and received in the same loop coil.*

*81. The method of claim 80 wherein said waves emitted from and received by the tablet are alternately emitted and received.*

*82. The method of claim 79 wherein said waves emitted from and received by the tablet are alternately emitted and received.*

*83. An implement having different characteristics associated therewith for designating one of the characteristics and a position to be detected by a tablet including means for signalling indications of the implement characteristic and position comprising*

*a cordless housing adapted to be manually held and manually moved proximate a surface of the tablet, the housing including:*

*a plurality of tuned circuits having no electric power supply connected to them, the plurality of tuned circuits including*

*an inductive and a capacitive reactance, each of said tuned circuits having reactances with different values,*

*a switch adapted to be activated while a region of the implement moves proximate the surface for connecting the capacitor and inductor in circuit with each other so that the tuned circuit has a predetermined resonant frequency, and*

*switch means for selectively connecting the reactances of the different plural tuned circuits in circuit with each other as a function of the selected characteristic of the implement;*

*the housing being constructed so that waves having a magnetic component can be coupled without wires between a reactance of the tuned circuit and structure outside of the housing.*

*84. An implement having different characteristics associated therewith for signalling one of the characteristics and position thereof to position detecting coils for a tablet associated with a surface with which the implement is adapted to be moved comprising:*

*a cordless housing adapted to be manually held and manually moved relative to the surface, the housing including:*

*a region adapted to be moved relative to the surface,*

*a plurality of tuned circuits having no electric power supply connected to them, the plurality of tuned circuits including*

*an inductive and capacitive reactance, each of said tuned circuits having a reactance with a different value,*

*a switch adapted to be activated while a region of the implement moves proximate the surface for connecting the capacitor and inductor in circuit with each other so that the tuned circuit has a predetermined resonant frequency, switch means for selectively connecting the reactances of the different plural tuned circuits in circuit with each other as a function of the selected characteristic of the implement:*

*the housing being constructed so that waves having a magnetic component can be coupled without wires between a reactance of the tuned circuit and a structure outside of the housing, and*

*means in proximity to the region for generating and supplying a magnetic field to the position detecting coils for the implement.*

*85. In combination,*

*a tablet including position detecting coils arranged in two coordinate directions,*

*a manually held implement having different characteristics associated with it and a region adapted to be moved relative to a surface of the tablet associated with the position detecting coils, the implement including:*

*a cordless housing adapted to be manually held and manually moved relative to the surface, the housing including:*

*a plurality of tuned circuits having no electric power supply connected to them, the tuned circuits including*

*an inductive and capacitive reactance,*

*each of said tuned circuits having reactances with different values, and*

*switch means for selectively connecting the reactances of the different plural tuned circuits in circuit with each other to provide different resonant frequencies of the tuned circuits as a function of the selected characteristic of the implement;*

*the housing being constructed so that waves having magnetic components can be coupled without wires between a reactance of the tuned circuit and a structure outside of the housing;*

*means in proximity to the region for generating and supplying a magnetic field to the position detecting coils for the implement; and*

*means responsive to the magnetic field coupled between the implement and the coils for signalling the characteristic of the implement and the position of the implement relative to the two coordinate directions.*

*86. A method of detecting the status of an implement in a coordinate input device comprising:*

*emitting a wave having a magnetic component from an emitting means of a position detecting tablet,*

*responding to the emitted wave to excite a tuned circuit in a position designating implement, the tuned circuit when excited emitting a wave having a frequency determined by the resonant frequency of the tuned circuit,*

*receiving a wave having a magnetic component in a wave receiving means of said tablet, and*

*deriving an indication of the status of said position designating implement in response to the received wave being the wave emitted by the tuned circuit, said waves emitted from said received by the tablet being alternately emitted and received.*

*87. A method of detecting a pen-*down status of a stylus in a coordinate input device comprising:

*emitting a wave having a magnetic component from an emitting means of a position detecting tablet,*

*responding to the emitted wave to excite a tuned circuit in a position designating implement, the tuned circuit when excited emitting a wave having a frequency determined by the resonant frequency of the tuned circuit,*

*receiving a wave having a magnetic component in a wave receiving means of said tablet, and*

*deriving an indication that the stylus is in a pen-*down status in response to the received wave being the wave emitted by the tuned circuit, said waves emitted from and received by the tablet being alternately emitted and received.

*88. A characteristic and position designating implement in a coordinate input device, comprising:*

*a housing shaped to be manually held,*

*plural tuned circuits each having a different predetermined resonant frequency associated with a different characteristic of the implement and a separate switch, said circuits being carried by said housing, said tuned circuits being excited by a wave including a magnetic component as emitted from a tablet and coupling a wave including a magnetic component to said tablet.*

*89. A manually held implement adapted to be urged against a surface comprising:*

*a cordless housing adapted to be manually held and manually moved on the surface, the housing including:*

*a region adapted to be moved across the surface,*

*a tuned circuit having no electric power supply connected to it, the tuned circuit including*

*a variable reactance coupled to the region so that at least several pressures produced by the region on the surface control the at least several values of the variable reactance, the housing being constructed so that waves having a magnetic component can be coupled without wires between a reactance of the tuned circuit and a structure outside of the housing.*

*90. A method of signalling the width of a trace resulting from an implement being moved relative to and against a surface, the implement including a region adapted to be moved across and against the surface and a tuned circuit having a resonant frequency, the circuit including a variable reactance having at least several values controlled in response to at least several pressures produced by the region on the surface, comprising energizing a coil in proximity to the surface with an AC wave having substantially the same frequency as the resonant frequency, the tuned circuit interacting with the AC wave to angle modulate the AC wave as a function of the at least several pressures produced by the region on the surface, and detecting the angle modulation of the angle modulated AC wave to indicate which of the at least several pressures is being exerted on the surface and the trace width.*

*91. In combination,*

*an implement including a region adapted to be moved across a surface and a tuned circuit having a resonant frequency, the circuit including a variable reactance having at least several values controlled in response to at least several pressures produced by the region on the surface,*

*apparatus for signalling the at least several pressures produced by the implement on the surface, the apparatus including:*

*a coil in proximity to the surface,*

*means for energizing the coil with an AC wave having substantially the same frequency as the resonant frequency, the tuned circuit interacting with the AC wave to angle modulate the AC wave to at least several values as a function of the at least several pressures produced by the region on the surface, and*

*means for detecting the value of the at least several values of the angle modulation of the angle modulated AC wave to indicate which of the at least several pressures is being exerted on the surface.*

*92. A position designating implement in a coordinate input device, comprising:*

*a housing,*

*a tuned circuit carried by the housing, the circuit having a resonant frequency varied in response to handling, said tuned circuit being excited by a wave having a magnetic component as emitted from a tablet to couple a wave having a magnetic component to said tablet, the resonant frequency being varied to at least several values by at least several pressures of a structure in the housing on the tablet surface.*

* * * * *